(12) United States Patent
Gao et al.

(10) Patent No.: US 12,184,348 B2
(45) Date of Patent: *Dec. 31, 2024

(54) INFORMATION SENDING AND RECEIVING METHOD AND DEVICE, STORAGE MEDIUM AND PROCESSOR

(71) Applicant: ZTE Corporation, Shenzhen (CN)

(72) Inventors: Bo Gao, Shenzhen (CN); YuNgok Li, Shenzhen (CN); Shujuan Zhang, Shenzhen (CN); Yijian Chen, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,996

(22) Filed: Aug. 15, 2023

(65) Prior Publication Data

US 2023/0388030 A1   Nov. 30, 2023

Related U.S. Application Data

(63) Continuation of application No. 16/764,914, filed as application No. PCT/CN2018/097523 on Jul. 27, 2018, now Pat. No. 11,784,733.

(30) Foreign Application Priority Data

Nov. 17, 2017 (CN) .......................... 201711147203.3

(51) Int. Cl.
*H04B 17/318* (2015.01)
*H04L 5/00* (2006.01)
*H04L 43/16* (2022.01)

(52) U.S. Cl.
CPC ......... *H04B 17/318* (2015.01); *H04L 5/0048* (2013.01); *H04L 43/16* (2013.01)

(58) Field of Classification Search
CPC .. H04B 17/318; H04B 7/0857; H04B 7/0639; H04L 5/0048; H04L 43/16; H04L 27/2602; H04W 36/0085
See application file for complete search history.

(56) References Cited

U.S. PATENT DOCUMENTS

2016/0134352 A1* 5/2016 Stirling-Gallacher ...................... H04B 7/0639 370/329
2016/0285660 A1* 9/2016 Frenne ................. H04L 27/261
(Continued)

FOREIGN PATENT DOCUMENTS

| CN | 104955061 A | 9/2015 |
|---|---|---|
| CN | 105744560 A | 7/2016 |

(Continued)

OTHER PUBLICATIONS

3GPP TSG RAN WG1 Meeting #90, Prague, Czech, Aug. 21-25, 2017, "Measurement and reporting for beam management", R1-1713594.
(Continued)

*Primary Examiner* — Ayaz R Sheikh
*Assistant Examiner* — Louis Samara
(74) *Attorney, Agent, or Firm* — CANTOR COLBURN LLP

(57) ABSTRACT

Provided are an information sending and receiving method and device, a storage medium and a processor. The information sending method includes: generating first signaling in a case where K elements in a beam-related parameter set exceed a first threshold corresponding to the K elements, wherein the K is an integer greater than or equal to 1; and sending the first signaling to a second communication node, wherein the first signaling carries information related to a reference signal.

10 Claims, 6 Drawing Sheets

(56) References Cited

U.S. PATENT DOCUMENTS

| | | | | |
|---|---|---|---|---|
| 2017/0006593 | A1* | 1/2017 | Liu | H04W 16/32 |
| 2017/0094543 | A1* | 3/2017 | Narasimha | H04W 24/10 |
| 2017/0230780 | A1* | 8/2017 | Chincholi | H04L 1/0036 |
| 2018/0270717 | A1* | 9/2018 | Kakishima | H04W 36/0085 |
| 2020/0059290 | A1* | 2/2020 | Pan | H04W 24/10 |
| 2020/0059921 | A1* | 2/2020 | Karjalainen | H04L 1/0028 |
| 2020/0112966 | A1* | 4/2020 | Liu | H04L 5/0051 |
| 2020/0228297 | A1* | 7/2020 | Zhang | H04L 1/06 |
| 2020/0235832 | A1* | 7/2020 | Lee | H04L 27/2602 |
| 2020/0244329 | A1* | 7/2020 | Xiao | H04B 17/318 |
| 2020/0304218 | A1 | 9/2020 | Gao et al. | |
| 2021/0084640 | A1* | 3/2021 | Kang | H04L 5/0048 |
| 2021/0111818 | A1* | 4/2021 | Zhu | H04L 5/0048 |

FOREIGN PATENT DOCUMENTS

| | | | | |
|---|---|---|---|---|
| CN | 106027181 | A | | 10/2016 |
| CN | 106165311 | A | | 11/2016 |
| CN | 106412942 | A | | 2/2017 |
| CN | 106788879 | A | | 5/2017 |
| CN | 106856611 | A | | 6/2017 |
| CN | 107005859 | A | | 8/2017 |
| CN | 107148790 | A | | 9/2017 |
| CN | 107171705 | A | | 9/2017 |
| CN | 108111286 | A | | 6/2018 |
| CN | 109451544 | A | | 3/2019 |
| CN | 109451544 | B * | 10/2021 | H04W 28/0231 |
| JP | 201453811 | A | | 3/2014 |
| KR | 1020160143509 | A | | 12/2016 |
| WO | WO-2015027437 | A1 * | 3/2015 | H04W 48/08 |
| WO | 2016186378 | A1 | | 11/2016 |
| WO | WO-2018232090 | A1 * | 12/2018 | H04B 7/0626 |

OTHER PUBLICATIONS

European Search Report for corresponding application EP18877750; Report dated Nov. 17, 2020.

International Search Report for corresponding application PCT/CN2018/097523 filed Jul. 27, 2018; Mail date Oct. 18, 2018.

Samsung, "L1 RSRP reporting for beam management", 3GPP TSG RAN WG1 Meeting 90bis, Prague CZ Oct. 2017, R1-1717618.

Samsung, On Beam Management, Measurement and Reporting, Samsung, , 3GPP TSG RAN WG1 Meeting 90bis, Prague CZ Oct. 2017, R1-1717605.

* cited by examiner

| First report part | CRI-1 |
|---|---|
| | RSRP at CRI-1 |
| Second report part | CRI-0 |
| | Differential RSRP at CRI-0 |
| | CRI-3 |
| | Differential RSRP at CRI-3 |
| | CRI-7 |
| | Differential RSRP at CRI-7 |

INFORMATION SENDING AND RECEIVING METHOD AND DEVICE, STORAGE MEDIUM AND PROCESSOR

CROSS REFERENCE TO RELATED APPLICATIONS

This is a continuation of U.S. patent application Ser. No. 16/764,914 which was filed on May 18, 2020 under 35 U.S.C. 371 as the U.S. National Stage of International Patent Application Number PCT/CN2018/097523 which was filed on Jul. 27, 2018 claiming priority to Chinese Patent Application Number 201711147203.3 filed on Nov. 17, 2018, the entire contents of all of which said applications are incorporated herein by reference.

TECHNICAL FIELD

The disclosure relates to, but is not limited to, an information sending and receiving method and device, a storage medium and a processor.

BACKGROUND

A high band with an ultra-wide bandwidth (that is, millimeter-wave communication) is an important development direction in future mobile communication. Particularly, when a spectrum resource and a physical network are accessed massively, an advantage of the millimeter wave becomes increasingly attractive. Many standard organizations, such as the Institute of Electrical and Electronics Engineers (IEEE), and the 3rd-Generation Partnership Project (3GPP), have embarked on the development of corresponding standardization work. For example, in a 3GPP criterion group, high-band communication will become an important innovative point of a 5G New Radio Access Technology (New RAT) by virtue of a significant advantage of a large bandwidth.

However, the high-band communication is also confronted with a challenge of link attenuation, specifically including that the loss on a propagation path is large, the absorption of air (particularly oxygen) is larger and the influence of rain attenuation is serious, etc. In the face of these challenges, with the utilization of characteristics that the high band has a short wavelength and is easy for integration of an antenna, etc., a high-band communication system may obtain high antenna gain and oppositional signal transmission loss via a multi-antenna array and a beamforming solution to guarantee a link margin and improve communication robustness.

In an antenna weight (also referred to as precoding, beam) training process, a sending end of the high band sends a training pilot, and a receiving end receives a channel and executes channel estimation. Then, the receiving end of the high band needs to feed back channel state information to the training sending end, so that a transceiving end finds multiple groups of transceiving end antenna weight pairs required for multi-path data transmission from optional transceiving end antenna weight pairs to improve the overall spectral efficiency.

In the millimeter-wave communication system of the relevant art, Reference Signal Receiving Power (RSRP) reporting is involved in channel quality reporting, and the RSRP reporting is used to support selection of a reference signal, and selection and determination of a beam. However, in the relevant art, the implementation complexity between the whole system and a user side cannot be controlled, and the overhead for configuration and feedback is large.

SUMMARY

The disclosure provides an information sending and receiving method and device, a storage medium and a processor, which can solve a problem on how to report information related to a reference signal.

The embodiments of the disclosure provide an information sending method, which is applied to a first communication node and includes that: first signaling is generated in a case where K elements in a beam-related parameter set exceed a first threshold corresponding to the K elements; and the first signaling is sent to a second communication node, wherein the first signaling carries information related to a reference signal, and the K is an integer greater than or equal to 1.

The embodiments of the disclosure further provide an information sending method, which is applied to a first communication node and includes that: a reference signal sent by a second communication node is received; information related to the reference signal is determined, wherein the information includes at least one of the followings: information of a reference signal related index, and information of an RSRP; and the information is fed back to the second communication node.

The embodiments of the disclosure provide an information receiving method, which is applied to a second communication node and includes that: first signaling sent by a first communication node received, wherein the first signaling is a signaling generated in a case where K elements in a beam-related parameter set exceed a first threshold corresponding to the K elements, the first signaling carries information related to a reference signal, and the K is an integer greater than or equal to 1.

The embodiments of the disclosure further provide an information sending method, which is applied to a second communication node and includes that: a reference signal is sent to a first communication node; and information fed back by the first communication node and related to the reference signal is received, wherein the information includes at least one of the followings: information of a reference signal related index, and information of an RSRP.

The embodiments of the disclosure further provide an information sending device, which is applied to a first communication node, and includes: a generation module and a sending module.

The generation module is configured to generate first signaling in a case where K elements in a beam-related parameter set exceed a first threshold corresponding to the K elements; and the sending module is configured to send the first signaling to a second communication node, wherein the first signaling carries information related to a reference signal, and the K is an integer greater than or equal to 1.

The embodiments of the disclosure further provide an information sending device, which is applied to a first communication node and includes: a receiving module, configured to receive a reference signal sent by a second communication node; a determination module, configured to determine information related to the reference signal, wherein the information includes at least one of the followings: information of a reference signal related index, and information of an RSRP; and a report module, configured to feed the determined information back to the second communication node.

The embodiments of the disclosure provide an information receiving device, which is applied to a second communication node and includes: a receiving module, configured to receive first signaling sent by a first communication node received, wherein the first signaling is a signaling generated in a case where K elements in a beam-related parameter set exceed a first threshold corresponding to the K elements, the first signaling carries information related to a reference signal, and the K is an integer greater than or equal to 1.

The embodiments of the disclosure further provide an information sending device, which is applied to a second communication node and includes: a sending module, configured to send a reference signal to a first communication node; and a receiving module, configured to receive information fed back by the first communication node and related to the reference signal, wherein the information includes at least one of the followings: information of a reference signal related index, and information of an RSRP.

The embodiments of the disclosure further provide a storage medium; the storage medium includes a stored program; and the program executes, when running, the above information receiving method provided by the embodiments of the disclosure.

The embodiments of the disclosure further provide a storage medium; the storage medium includes a stored program; and the program executes, when running, the above information sending method provided by the embodiments of the disclosure.

The embodiments of the disclosure further provide a processor; the processor is configured to run a program; and the program executes, when running, the above information receiving method provided by the embodiments of the disclosure.

The embodiments of the disclosure further provide a processor; the processor is configured to run a program; and the program executes, when running, the above information sending method provided by the embodiments of the disclosure.

The embodiments of the disclosure further provide an information sending device, which includes: a memory and a processor.

The memory is configured to store a program for sending information.

The processor is configured to run the program; and the program executes, when running, the above information sending method.

The embodiments of the disclosure further provide an information receiving device, which includes: a memory and a processor.

The memory is configured to store a program for receiving information.

The processor is configured to run the program; and the program executes, when running, the above information receiving method.

Through the embodiments of the disclosure, as first signaling carrying information related to a reference signal is generated in a case where K elements in a beam-related parameter set exceed a first threshold corresponding to the K elements, and the first signaling is sent to a second communication node, or upon the reception of a reference signal sent by a second communication node, information related to the reference signal is sent to the second communication node, that is, the information related to the reference signal is reported in an active reporting manner or in a manner indicated by the second communication node, a problem on how to report the information related to the reference signal may be solved.

DETAILED DESCRIPTION OF THE EMBODIMENTS

The disclosure is described below in detail with reference to the accompanying drawings and in combination with the embodiments. It should be noted that the embodiments of the disclosure and the characteristics of the embodiments may be combined with each other if there is no conflict.

It is to be noted that, terms such as "first" and "second" in the specification, claims and accompanying drawings of the disclosure are only used to distinguish similar objects and are unnecessary to describe a special order or a precedence order.

Figure 1:
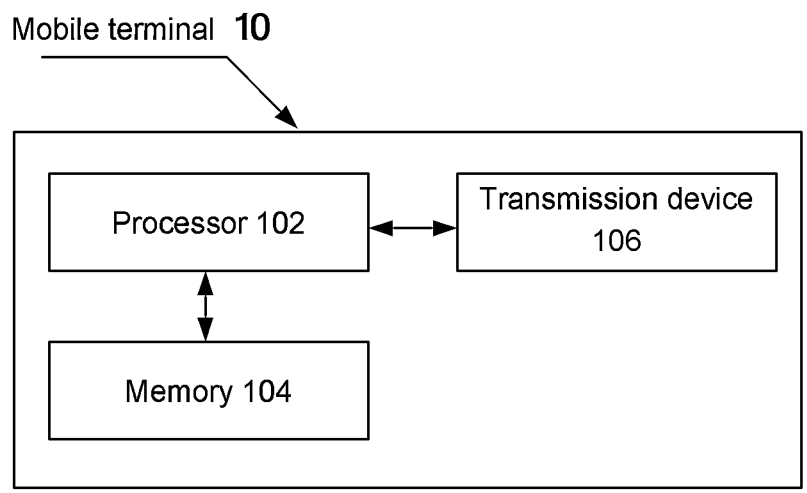
FIG. 1 is a block diagram of a hardware structure of a mobile terminal provided by an embodiment of the disclosure.

The method embodiment provided by the embodiments of the disclosure may be executed in a mobile terminal, a computer terminal or a similar operation device. For example, the method embodiment is executed on the mobile terminal, and FIG. 1 is a block diagram of a hardware structure of a mobile terminal for an information sending method according to an embodiment of the disclosure. As shown in FIG. 1, the mobile terminal 10 may include one or more (only one is shown in the figure) processors 102 (the processor 102 may include but not limited to a processing device such as a Microcontroller Unit (MCU) or a Field-Programmable Gate Array (FPGA)), a memory 104 configured to store data, and a transmission device 106 for a communication function. Those of ordinary skill in the art may understand that the structure shown in FIG. 1 is merely for illustration, rather than a limit to the above structure of the electronic device. For example, the mobile terminal 10 may further include more or less components shown in FIG. 1, or have a configuration different from FIG. 1.

The memory 104 may be configured to store a software program and a module of application software, such as a program instruction/module corresponding to the information sending method in the embodiments of the disclosure. The processor 102 executes, by running the software program and the module stored in the memory 104, various functional applications as well as data processing, that is, implementation of the above method. The memory 104 may include a high-speed Random Access Memory (RAM), and may further include a non-volatile memory such as one or more magnetic storage devices, a flash memory or other non-volatile solid-state memories. In some examples, the memory 104 may further include a memory remotely disposed relative to the processor 102; and these remote memories may be connected to the mobile terminal 10 via a network. An example of the network includes but not limited to an Internet, an intranet, a local area network, a mobile communication network, and a combination thereof.

The transmission device 106 is configured to receive or transmit data via one network. The network may include a wireless network provided by a communication supplier of the mobile terminal 10. In an example, the transmission device 106 includes a Network Interface Controller (NIC) that may be connected to other network devices via an eNB to communicate with the Internet. In an example, the transmission device 106 may be a Radio Frequency (RF) module that is configured to communicate with the Internet via a wireless manner.

Figure 2:
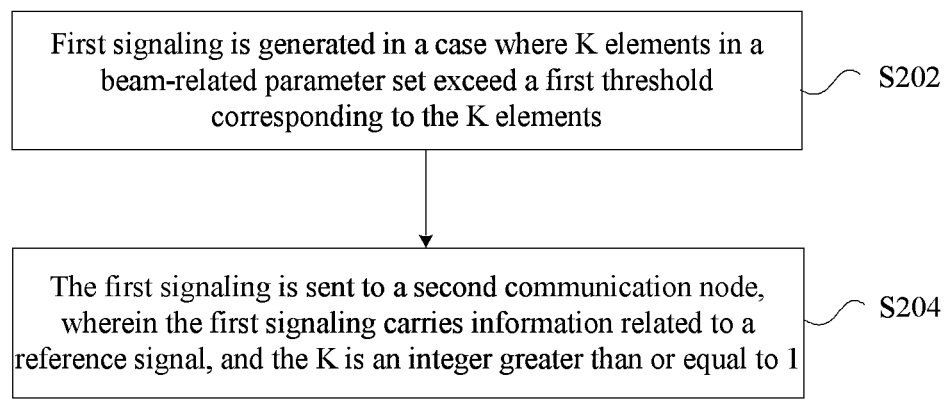
FIG. 2 is a first flowchart of an information sending method provided by an embodiment of the disclosure.

This embodiment provides an information sending method that runs in the mobile terminal. FIG. 2 is a first flowchart of an information sending method provided by an embodiment of the disclosure. As shown in FIG. 2, the process includes the following steps.

At Step S202: first signaling is generated in a case where K elements in a beam-related parameter set exceed a first threshold corresponding to the K. elements.

At Step 204: the first signaling is sent to a second communication node, wherein the first signaling carries information related to a reference signal, and the K is an integer greater than or equal to 1.

As first signaling carrying information related to a reference signal is generated in a case where K elements in a beam-related parameter set exceed a first threshold corresponding to the K elements, and the first signaling is sent to a second communication node, that is, the information related to the reference signal is reported in an active reporting manner, a problem on how to report the information related to the reference signal may be solved.

In an embodiment, the step S204 may be implemented as follows: the first signaling is sent to the second communication node via at least one of the following channels: a Physical Uplink Control Channel (PUCCH), and a Physical Random Access Channel (PRACH), wherein the PRACH includes: a contention-based PRACH or a contention-free PRACH.

In an embodiment, the information related to the reference signal includes at least one of the followings: a reference signal index, channel state information, and an RSRP.

In an embodiment, the first signaling directly carries the information related to the reference signal or a position of a time-frequency code resource used by the first signaling indicates the information related to the reference signal.

In an embodiment, before the step S204, the method may further include that: at least one of the following threshold information configured by the second communication node for the first communication node is received: a first signaling number-of-times threshold, wherein in a case where the number of sending times of the first signaling exceeds the first signaling number-of-times threshold, the first signaling is stopped to be sent; and a cumulative time threshold, wherein in a case where a time duration between a timing start point of a timing unit and a moment for sending the first signaling exceeds the cumulative time threshold, the first signaling is stopped to be sent. By configuring a threshold of the active reporting manner, that is, limiting a configuration of the active reporting manner, the reporting efficiency can be improved.

In an embodiment, the method may further include at least one of the followings: in a case where the number of sending times of the first signaling exceeds the first signaling number-of-times threshold and/or the tinting duration of the timing unit exceeds the cumulative time threshold, specified information is sent to a high layer; in a case where a response message of the first signaling that is sent by the second communication node is not received within first predetermined time after the first signaling is sent for the first signaling number-of-times threshold, the specified information is sent to the high layer; and the high layer sends the specified information within second predetermined time after the timing duration of the timing unit exceeds the cumulative time threshold.

In an embodiment, the specified information includes at least one of the following information: information for indicating beam recovery failure; and a trigger condition for a wireless link failure.

In an embodiment, the timing start point is one of the followings: a moment when the link or beam failure is detected; a marking moment of a time window where the moment when the link or beam failure is detected is located; a moment when a beam failure detection result reaches a preset threshold; a marking moment of a time window where the moment when the beam failure detection result reaches the preset threshold is located; a moment for sending the first signaling for a first time; a marking moment of a time window where the moment for sending the first signaling for the first time is located; a moment for configuring an uplink resource for bearing the first signaling; a marking moment of a time window where the moment for configuring the uplink resource for bearing the first signaling is located; a moment for sending the reference signal index borne on the first signaling; a marking moment of a time window where the moment for sending the reference signal index borne on the first signaling is located; a moment when the PUCCH is used for a first time to send the first signaling; a marking moment of a time window where the moment when the PUCCH is used for the first time to send the first signaling is located; a moment when the PRACH is used for a first time to send the first signaling; and a marking moment of a time window where the moment when the PRACH is used for the first time to send the first signaling is located.

In an embodiment, the marking time of the time window includes one of the followings: a start moment of the time window, a middle moment of the time window, and an end moment of the time window.

In an embodiment, the number of sending times of the first signaling includes at least one of the followings: the number of times for sending the first signaling by using a PUCCH resource; the number of times for sending the first signaling by using a PRACH resource; and a sum of the number of times for sending the first signaling by using the PRACH resource and the number of times for sending the first signaling by using the PUCCH resource.

In an embodiment, in a case where a reference signal associated with N PRACHs meets a channel pattern condition, the N PRACH resources are allocated in a same time domain unit or the N PRACHs support Frequency Division Multiplexing (FDM), wherein the time domain unit includes at least one of the followings: a time slot, a subframe, a symbol and a symbol set.

In an embodiment, the reference signal includes at least one of the followings: a Channel State Information-Reference Signal (CSI-RS), and a Synchronization Signal (SS) block.

In an embodiment, the PRACH resource of the first signaling may be determined via at least one of the following manners: a time domain position of the PRACH resource occupied by the first signaling is determined via a time domain position of a PRACH that is accessed initially and corresponding to an SS block associated with the PRACH of the first signaling; the PRACH resource occupied by the first signaling is determined via a PRACH resource that is accessed initially and corresponding to an SS block associated with the PRACH of the first signaling; the time domain position of the PRACH resource occupied by the first signaling is determined via a time domain position of a PRACH that is accessed initially and corresponding to an SS block meeting a same channel pattern condition; the PRACH resource occupied by the first signaling is determined via the PRACH resource that is accessed initially and corresponding to the SS block meeting the same channel pattern condition; a time domain offset of the PRACH that is accessed initially and corresponding to the SS block associated with the PRACH of the first signaling is the same as a time domain offset of the PRACH resource occupied by the first signaling; a time-frequency offset of the PRACH that is accessed initially and corresponding to the SS block associated with the PRACH of the first signaling is the same as a time-frequency offset of the PRACH resource occupied by the first signaling; a time domain offset of the PRACH that is accessed initially and corresponding to the SS block meeting the same channel pattern condition is the same as a time domain position of the MACH resource occupied by the first signaling; and a time-frequency offset of the PRACH that is accessed initially and corresponding to the SS block meeting the same channel pattern condition is the same as a time-frequency position of the PRACH resource occupied by the first signaling. The SS block meeting the same channel pattern condition is an SS block of a CSI-RS associated with the PRACH occupied by the first signaling.

In an embodiment, before the step SI 04, the method may further include at least one of the followings: second signaling sent by the second communication node is received, wherein the second signaling carries a predetermined PRACH resource, the predetermined PRACH resource is a PRACH resource selected from a configured or pre-defined PRACH resource set, and the predetermined PRACH resource is used for indicating a time domain and/or frequency domain position of the PRACH resource occupied by the first signaling; and third signaling sent by the second communication node is received, wherein the third signaling carries a predetermined CSI-RS resource and/or SS block associated with the PRACH resource of the first signaling, the predetermined CSI-RS resource and/or SS block is selected from a configured or pre-defined CSI-RS resource set and/or SS block set, and the predetermined CSI-RS resource and/or SS block is associated with the PRACH resource occupied by the first signaling.

In an embodiment, the PRACH resource occupied by the first signaling is a PRACH resource that is accessed initially and corresponding to the SS block associated with the PRACH occupied by the first signaling; and the PRACH resource occupied by the first signaling is a PRACH resource that is accessed initially and corresponding to the SS block, meeting the same channel pattern condition, of the CSI-RS of the PRACH occupied by the first signaling.

In an embodiment, the second signaling includes a first bitmap, wherein when a value of a bit in the first bitmap is equal to a first specified value, a PRACH resource corresponding to the bit in the PRACH resource set is selected. The third signaling includes a second bitmap, Wherein when a value of a bit in the second bitmap is equal to a second specified value, a CSI-RS resource and/or an SS block corresponding to the bit in the CSI-RS resource set and/or the SS block set is selected.

In an embodiment, the method further includes that: a frequency domain step value configured by the second communication node is received, wherein the frequency domain step value is used for indicating a frequency domain interval between PRACHs in a same time domain unit.

In an embodiment, the step that a frequency domain step value configured by the second communication node is received may be executed before or after the step S104 and is not limited thereto.

In an embodiment, configuration information for sending the first signaling via the PUCCH is the same as configuration information for sending the first signaling via the PRACH, wherein the configuration information includes at least one of the followings: a duration of a response window of the second communication node; a time offset between the response window of the second communication node and time for sending the first signaling to the second communication node; a CORESET resource; and a search space.

In an embodiment, an execution main body of the above steps may be the first communication node such as a terminal but is not limited thereto.

Figure 3:
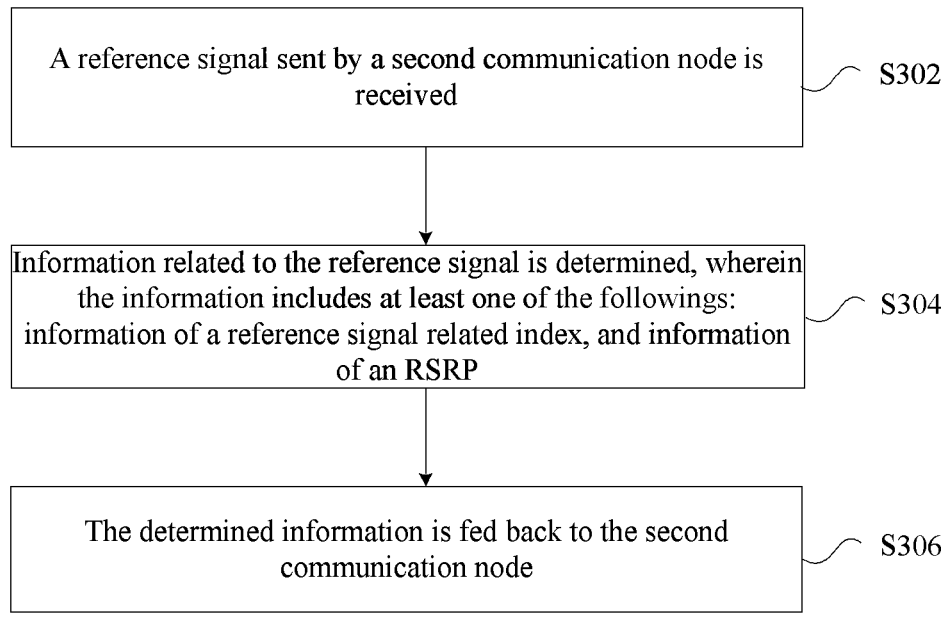
FIG. 3 is a second flowchart of an information sending method provided by an embodiment of the disclosure.

This embodiment provides an information sending method that runs in the mobile terminal. FIG. 3 is a second flowchart of an information sending method provided by an embodiment of the disclosure. As shown in FIG. 3, the process includes the following steps.

At Step S302: a reference signal sent by a second communication node is received.

At Step S304: information related to the reference signal is determined, wherein the information includes at least one of the followings: information of a reference signal related index, and information of an RSRP.

At Step S306: the information is fed back to the second communication node.

Through the above steps, upon the reception of a reference signal sent by a second communication node, information related to the reference signal is sent to the second communication node, that is, the information related to the reference signal is reported in a manner indicated by the second communication node, a problem on how to report the information related to the reference signal may be solved.

In an embodiment, the number of the reference signal related indexes included in the information is smaller than or equal to feedback number of the reference signal related indexes configured by the second communication node for the first communication node.

In an embodiment, in a case where at least one of the following conditions is met, the information includes the reference signal related index: a difference value of an RSRP of the reference signal relative to a maximum RSRP is smaller than or equal to a first threshold; a difference value of the RSRP of the reference signal relative to a maximum RSRP in a group where the reference signal is located is smaller than or equal to a second threshold; a difference value of the RSRP of the reference signal relative to an RSRP of a specified reference signal is smaller than or equal to a third threshold; a difference value of the RSRP of the reference signal relative to a reference power for calculating a differential RSRP is smaller than or equal to a fourth threshold; and the RSRP of the reference signal is greater than or equal to a fifth threshold.

In an embodiment, the first threshold, the second threshold, the third threshold and the fifth threshold are determined via one of the following manners: a value configured by the second communication node, and a pre-defined value. The fourth threshold is determined via one of the following manners: a value configured by the second communication node, a value determined by a variation range of the differential RSRP, and a pre-defined value.

In an embodiment, the information includes: first information and second information, wherein the first information includes at least one of the followings: the number of the reference signal related indexes; the number of the reference signal groups; a group index of the reference signal group; a maximum RSRP value in each reference signal group; a maximum RSRP in RSRPs of all reference signals; a reference power for calculating a differential RSRP; a reference signal related index associated with the reference power for calculating the differential RSRP; a reference signal related index specified by the second communication node; and an RSRP value of a reference signal specified by the second communication node. The second information includes at least one of the followings: the reference signal related index, and the RSRP.

In an embodiment, the RSRP included in the second information is the differential RSRP In an embodiment, the reference signal related index included in the second information is indicated by a bitmap.

In an embodiment, the first information and the second information are fed back via one of the following manners: the first information and the second information are fed back by using the PUCCH resource; the first information and the second information are fed back by using the PUSCH resource; and the first information is fed back by using the PUCCH resource, and the second information is fed back by using the PUSCH resource.

In an embodiment, in a case where the first information is fed back by using the PUCCH resource, and the second information is fed back by using the PUSCH resource, the method further includes one of the followings: the second communication node has no capability of configuring the first information, wherein the first information is used for instructing the first communication node to feed back an RSRP in a differential RSRP manner; the second communication node has the capability of configuring the first information; the second communication node does not configure the first information for the first communication node; and the second communication node configures the first information for the first communication node.

In an embodiment, a modulation coding manner of the first information is different from a modulation coding manner of the second information.

In an embodiment, the method further includes at least one of the followings: in a case where the reference signal is X reference signals in the reference signal group, an RSRP corresponding to the X reference signals is fed back in a form of the differential RSRP; in a case where Y reference signals are selected from each reference signal group in D reference signal groups, and the reference signal is selected reference signal, an RSRP corresponding to the selected reference signal is fed back in the form of the referential RSRP; and in a case where the reference signal is J reference signals, an RSRP corresponding to the J reference signals is fed back in the form of the differential RSRP. The X, the Y, the D and the J are positive integers greater than or equal to 1.

In an embodiment, in the case where the reference signal is the X reference signals in the reference signal group, the reference power for calculating the differential RSRP of the X reference signals includes at least one of the followings: an RSRP of a specified reference signal in the reference signal group; an RSRP of a specified reference signal out of the reference signal group; a reference value configured by the second communication node for calculating the differential RSRP; and an RSRP of a specified reference signal in the X reference signals.

In an embodiment, in the case where Y reference signals are selected from each reference signal group in D reference signal groups, and the reference signal is the selected reference signal, the reference power for calculating the differential RSRP of the selected reference signal includes at least one of the followings: an RSRP of a specified reference simal in the D reference signal groups; an RSRP of a specified reference signal out of the D reference signal groups; a reference value configured by the second communication node for calculating the differential RSRP; and an RSRP of a specified reference signal in the Y reference signal of the D reference signal groups.

In an embodiment, in the case where the reference signal is J reference signals, the reference power for calculating the differential RSRP of the J reference signals includes at least one of the followings: an RSRP of a specified reference signal in the J reference signals; a reference value configured by the second communication node for calculating the differential RSRP; and an RSRP of a specified reference signal out of the J reference signals.

In an embodiment, in a case where the specified reference signal is located in one or more specified reference signal groups, the specified reference signal is a reference signal having a maximum or minimum RSRP in the one or more specified reference signal groups; or, the specified reference signal is a reference signal having a maximum or minimum RSRP in all reference signals.

In an embodiment, the step value of the differential RSRP is determined via at least one of the following manners: the step value is determined according to a pre-defined step value; the step value is determined according to the reference power for calculating the differential RSRP; and the step value is determined according to the reference power for calculating the differential RSRP and a threshold value configured by the second communication node. In a case where multiple differential RSRPs are fed back via multiple identifiers, the step value of the differential RSRP is a difference between a first differential RSRP indicated by a first identifier in the multiple identifier and a second differential RSRP indicated by a second identifier in the multiple identifier. The first identifier is adjacent to the second identifier.

In an embodiment, the first identifier may be a numeral and may also be a letter but is not limited thereto.

In an embodiment, the first identifier of the numeral is used as an example for description, that is, the above multiple differential RSRPs may be fed back via a numeral manner. For example, 5 differential RSRPs are fed back by using numerals 12345, the differential RSRP identified by the numeral 2 is a value obtained by adding the step value to the differential RSRP identified by the numeral 1, the differential RSRP identified by the numeral 3 is a value obtained by adding the step value to the differential RSRP identified by the numeral 2, and so on.

In an embodiment, the differential RSRP may be fed back via at least one of the followings: for different types of reference signals, RSRPs for the different types of reference signals are respectively fed back in a form of the differential RSRP; for different types of reference signals, RSRPs for the different types of reference signals are simultaneously fed back in a form of the differential RSRP; an RSRP for a first type of reference signal is fed back in the form of the differential RSRP and an RSRP for a second type of reference signal is fed back directly; for different reference signal sets configured by the second communication node, RSRPs for the different reference signal sets are respectively fed back in the form of the differential RSRP; and for different reference signal groups fed back by the first communication node, RSRPs for the different reference signal groups are respectively fed back in the form of the differential RSRP.

In an embodiment, the RSRP is fed back in the form of the differential RSRP in at least one of the following conditions: a reference signal type of the reference signal is a specified reference signal type; and the number of the reference signals is greater than or equal to a predetermined threshold.

In an embodiment, before the step S304, the method may further include: a report mode configured by the second communication node and used for feeding back the information related to the reference signal is obtained. The report mode includes at least one of the followings: a first report mode and a second report mode. A relationship between the first report mode and the second report mode includes at least one of the followings: a configuration priority of the first report mode is higher than a configuration priority of the second report mode; a threshold value for limiting and feeding back the information related to the reference signal in the first report mode is smaller than a threshold value for limiting and feeding back the information related to the reference signal in the second report mode; in the first report mode, information related to all reference signals configured by the second communication node for the first communication node is fed back to the second communication node; and in the second report mode, the number of information related to the reference signal for the second communication node is smaller than or equal to the number of feedback information related to the reference signal configured by the second communication node for the first communication node.

In an embodiment, in a case where the report node is the first report mode, an ordinal position of the RSRP of the reference signal is used for indicating the reference signal related index of the reference signal.

In an embodiment, in the first report mode and the second report mode, the RSRP is respectively fed back in the form of the differential RSRP. The RSRP is fed back directly in the first report mode, and the RSRP is fed back in the form of the differential RSRP in the second report mode. The RSRP is fed back directly in the second report mode, and the RSRP is fed back in the form of the differential RSRP in the first report mode.

In an embodiment, in a case where the RSRP is respectively fed back in the form of the differential RSRP in the first report mode and the second report mode, a step value of a differential RSRP in differential reporting of the first report mode is different from a step value of a differential RSRP in differential reporting of the second report mode, or, the step value of the differential RSRP in the differential reporting of the first report mode and the step value of the differential RSRP in the differential reporting of the second report mode are respectively allocated.

In an embodiment, an execution main body of the steps in the embodiment shown in FIG. 3 may be the first communication node such as a terminal but is not limited thereto.

By means of the above-mentioned descriptions on the implementation manner, the person skilled in the art may clearly understand that the disclosure may be implemented by software plus a necessary universal hardware platform, and may also be implemented by hardware, but under most conditions, the former is a better implementation manner. Based on such an understanding, the technical solutions of the disclosure essentially, or the part contributing to the conventional art may be implemented in a form of a software product. The computer software product is stored in a storage medium (such as a Read Only Memory (ROM)/ Random Access Memory (RAM), a magnetic disk, and an optical disc) and includes a plurality of instructions for instructing a terminal device (which may be a mobile phone, a computer, a server, or a network device, etc.) to execute the methods described in the embodiments of the disclosure.

Figure 4:
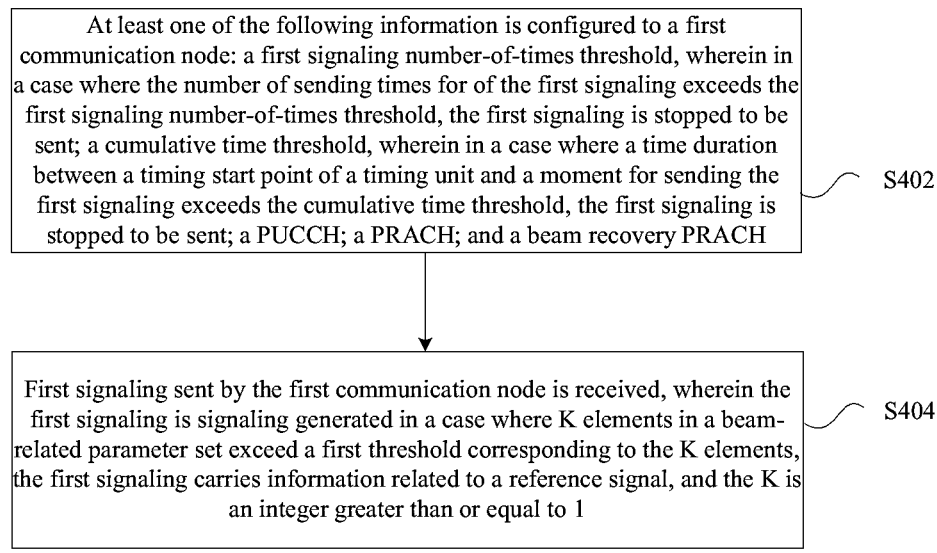
FIG. 4 is a first flowchart schematic diagram of an information receiving method provided by an embodiment of the disclosure.

The embodiments of the disclosure provide an information receiving method, which is applied to a second communication node. FIG. 4 is a first flowchart of an information receiving method provided by an embodiment of the disclosure. As shown in FIG. 4, the process includes the following steps.

At Step S402: at least one of the following information is configured to a first communication node: a first signaling number-of-times threshold, wherein in a case where the number of sending times of the first signaling exceeds the first signaling number-of-times threshold, the first signaling is stopped to be sent; a cumulative time threshold, wherein in a case where a time duration between a tuning start point of a timing unit and a moment for sending the first signaling exceeds the cumulative time threshold, the first signaling is stopped to be sent; a PUCCH; a PRACH; and a beam recovery PRACH.

At Step S404: first signaling sent by the first communication node is received, wherein the first signaling is signaling generated in a case where K elements in a beam-related parameter set exceed a first threshold corresponding to the K elements, the first signaling carries information related to a reference signal, and the K is an integer greater than or equal to 1.

Through the above steps, as first signaling sent by a first communication node and carrying information related to a reference signal is generated in a case where K elements in a beam-related parameter set exceed a first threshold corresponding to the K elements, that is, the information related to the reference signal is reported in an active reporting manner of the first communication node, a problem on how to report the information related to the reference signal may be solved.

In an embodiment, the step S404 may be combined with the step S402, and the step S404 may also be executed independently, and is not limited thereto.

In an embodiment, the step S404 may be implemented as follows: the first signaling is received via at least one of the following channels: a PUCCH, and a PRACH, wherein the PRACH includes: a contention-based PRACH or a contention-free PRACH.

In an embodiment, the step S402 may be implemented as follows: the information is configured to the first communication node according to a capability of the first communication node, wherein the capability of the first communication node includes at least one of the followings: a capability of the first communication node for supporting beam correspondence, a capability of the first communication node for supporting non beam correspondence, a capability of the first communication node for supporting partial beam correspondence, and an antenna parameter of the first communication node.

In an embodiment, the information related to the reference signal includes at least one of the followings: a reference signal index, channel state information, and an RSRP.

In an embodiment, the first signaling directly carries the information related to the reference signal or a position of a time-frequency code resource used by the first signaling indicates the information related to the reference signal.

In an embodiment, in a case where a reference signal associated with N PRACHs meets a channel pattern condition, the N PRACH resources are allocated in a same time domain unit or the N PRACHs support FDM, wherein the time domain unit includes at least one of the followings: a time slot, a subframe, a symbol and a symbol set.

In an embodiment, the reference signal includes at least one of the followings: a CSI-RS, and an SS block.

In an embodiment, before the step S404, the method may further include at least one of the followings: second signaling is sent to the first communication node, wherein the second signaling carries a predetermined PRACH resource, the predetermined PRACH resource is a PRACH resource selected from a configured or pre-defined PRACH resource set, and the predetermined PRACH resource is used for indicating a time domain and/or frequency domain position of the PRACH resource occupied by the first signaling; and third signaling is sent to the first and second communication nodes, wherein the third signaling carries a predetermined CSI-RS resource and/or SS block associated with the PRACH resource of the first signaling, the predetermined CSI-RS resource and/or SS block is selected from a configured or pre-defined CSI-RS resource set and/or SS block set, and the predetermined CSI-RS resource and/or SS block is associated with the PRACH resource occupied by the first signaling.

In an embodiment, the PRACH resource occupied by the first signaling is a PRACH resource that is accessed initially and corresponding to the SS block associated with the PRACH occupied by the first signaling; and the PRACH resource occupied by the first signaling is a PRACH resource that is accessed initially and corresponding to the SS block, meeting the same channel pattern condition, of the CSI-RS of the PRACH occupied by the first signaling.

In an embodiment, the second signaling includes a first bitmap, wherein when a value of a bit in the first bitmap is equal to a first specified value, a PRACH resource corresponding to the bit in the PRACH resource set is selected. The third signaling includes a second bitmap, wherein when a value of a bit in the second bitmap is equal to a second specified value, a CSI-RS resource and/or an SS block corresponding to the bit in the CSI-RS resource set and/or the SS block set is selected.

In an embodiment, the method further includes that: a frequency domain step value is configured to the first communication node, wherein the frequency domain step value is used for indicating a frequency domain interval between PRACHs in a same time domain unit.

In an embodiment, the step that a frequency domain step value is configured to the first communication node may be executed before or after the step S304 and is not limited thereto.

In an embodiment, configuration information for sending the first signaling sent via the PUCCH is the same as configuration information for sending the first signaling sent via the PRACH, wherein the configuration information includes at least one of the followings: a duration of a response window of the second communication node; a time offset between the response window of the second communication node and time for sending the first signaling to the second communication node; a CORESET resource; and a search space.

In an embodiment, an execution main body of the above steps may be the second communication node such as an eNB but is not limited thereto.

Figure 5:
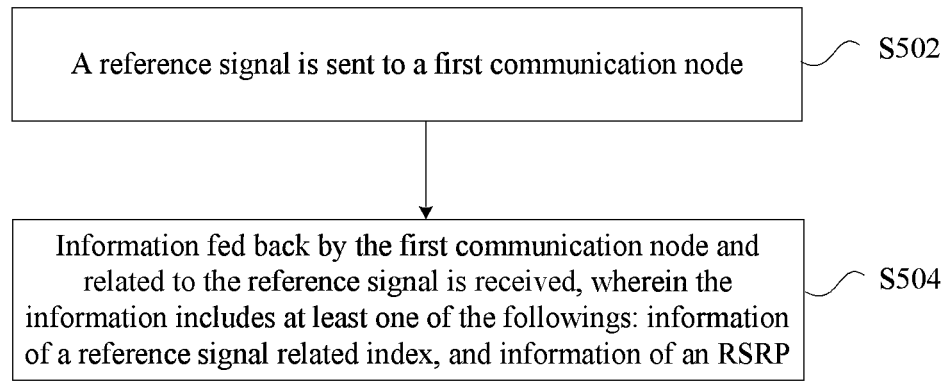
FIG. 5 is a second flowchart schematic diagram of an information sending method provided by an embodiment of the disclosure.

The embodiments of the disclosure further provide an information sending method, which is applied to a second communication node. FIG. 5 is a second flowchart of an information sending method provided by an embodiment of the disclosure. As shown in FIG. 5, the process includes the following steps.

At Step S502: a reference signal is sent to a first communication node.

At Step S504: information fed back by the first communication node and related to the reference signal is received, wherein the information includes at least one of the followings: information of a reference signal related index, and information of an RSRP.

Through the above steps, upon sending a reference signal to a first communication node, information sent by the first communication node and related to the reference signal is received, that is, the first communication node reports the information related to the reference signal via a manner indicated by a second communication node, a problem on how to report the information related to the reference signal may be solved.

In an embodiment, the number of the reference signal related indexes included in the information is smaller than or equal to feedback number of the reference signal related indexes configured by the second communication node for the first communication node.

In an embodiment, in a case where at least one of the following conditions is met, the information includes the reference signal related index: a difference value of an RSRP of the reference signal relative to a maximum RSRP is smaller than or equal to a first threshold; a difference value of the RSRP of the reference signal relative to a maximum RSRP in a group where the reference signal is located is smaller than or equal to a second threshold; a difference value of the RSRP of the reference signal relative to an RSRP of a specified reference signal is smaller than or equal to a third threshold; a difference value of the RSRP of the reference signal relative to a reference power for calculating a differential RSRP is smaller than or equal to a fourth threshold; and the RSRP of the reference signal is greater than or equal to a fifth threshold.

In an embodiment, the first threshold, the second threshold, the third threshold and the fifth threshold are determined via one of the following manners: a value configured by the second communication node, and a pre-defined value. The fourth threshold is determined via one of the following manners: a value configured by the second communication node, a value determined by a variation range of the differential RSRP, and a pre-defined value.

In an embodiment, the information includes: first information and second information, wherein the first information includes at least one of the followings: the number of the reference signal related indexes; the number of the reference signal groups; a group index of the reference signal group; a maximum RSRP value in each reference signal group; a maximum RSRP in RSRPs of all reference signals; a reference power for calculating a differential RSRP; a reference signal related index associated with the reference power for calculating the differential RSRP; a reference signal related index specified by the second communication node; and an RSRP value of a reference signal specified by the second communication node. The second information includes at least one of the followings: the reference signal related index, and the RSRP.

In an embodiment, the RSRP included in the second information is the differential RSRP.

In an embodiment, the reference signal related index included in the second information is indicated by a bitmap.

In an embodiment, the first information and the second information fed back via one of the following manners are received: the first information and the second information are fed back by using the PUCCH resource; the first information and the second information are fed back by using the PUSCH resource; and the first information is fed back by using the PUCCH resource; and the second information is fed back by using the PUSCH resource.

In an embodiment, in a case where the first information is fed back by using the PUCCH resource, and the second information is fed back by using the PUSCH resource, the method further includes one of the followings: the second communication node has no capability of configuring the first information, wherein the first information is used for instructing the first communication node to feed back an RSRP in a differential RSRP manner; the second communication node has the capability of configuring the first information; the second communication node does not configure the first information for the first communication node; and the second communication node configures the first information for the first communication node.

In an embodiment, a modulation coding manner of the first information is different from a modulation coding manner of the second information.

In an embodiment, the method further includes at least one of the followings: in a case where the reference signal is X reference signals in the reference signal group, an RSRP corresponding to the X reference signals is received in a form of the differential RSRP; in a case where Y reference signals are selected from each reference signal group in D reference signal groups, and the reference signal is selected reference signal, an RSRP corresponding to the selected reference signal is received in the form of the referential RSRP; and in a case where the reference signal is J reference signals, an RSRP corresponding to the J reference signals is received in the form of the differential RSRP. The X, the Y, the D and the J are positive integers greater than or equal to 1.

In an embodiment, in the case where the reference signal is the X reference signals in the reference signal group, the reference power for calculating the differential RSRP of the X reference signals includes at least one of the followings: an RSRP of a specified reference signal in the reference signal group; an RSRP of a specified reference signal out of the reference signal group; a reference value configured by the second communication node for calculating the differential RSRP; and an RSRP of a specified reference signal in the X reference signals.

In an embodiment, in the case where Y reference signals are selected from each reference signal group in D reference signal groups, and the reference signal is the selected reference signal, the reference power for calculating the differential RSRP of the selected reference signal includes at least one of the followings: an RSRP of a specified reference signal in the D reference signal groups; an RSRP of a specified reference signal out of the D reference signal groups; a reference value configured by the second communication node for calculating the differential RSRP; and an RSRP of a specified reference signal in the Y reference signal of the D reference signal groups.

In an embodiment, in the case where the reference signal is J reference signals, the reference power for calculating the differential RSRP of the J reference signals includes at least one of the followings: an RSRP of a specified reference signal in the J reference signals; a reference value configured by the second communication node for calculating the differential RSRP; and an RSRP of a specified reference signal out of the J reference signals.

In an embodiment, in a case where the specified reference signal is located in one or more specified reference signal groups, the specified reference signal is a reference signal having a maximum or minimum RSRP in the one or more specified reference signal groups; or, the specified reference signal is a reference signal having a maximum or minimum RSRP in all reference signals.

In an embodiment, the step value of the differential RSRP is determined via at least one of the following manners: the step value is determined according to a pre-defined step value; the step value is determined according to the reference power for calculating the differential RSRP; and the step value is determined according to the reference power for calculating the differential RSRP and a threshold value configured by the second communication node. In a case where multiple differential RSRPs are fed back via multiple identifiers, the step value of the differential RSRP is a difference between a first differential RSRP indicated by a first identifier in the multiple identifier and a second differential RSRP indicated by a second identifier in the multiple identifier. The first identifier is adjacent to the second identifier.

In an embodiment, the first identifier may be a numeral and may also be a letter but is not limited thereto.

In an embodiment, the first identifier of the numeral is used as an example for description, that is, the above multiple differential RSRPs may be received via a numeral manner. For example, 5 differential RSRPs are received by using numerals 12345, the differential RSRP identified by the numeral 2 is a value obtained by adding the step value to the differential RSRP identified by the numeral 1, the differential RSRP identified by the numeral 3 is a value obtained by adding the step value to the differential RSRP identified by the numeral 2, and so on.

In an embodiment, the differential RSRP may be received via at least one of the followings: for different types of reference signals, RSRPs for the different types of reference signals are respectively received in a form of the differential RSRP; for different types of reference signals, RSRPs for the different types of reference signals are simultaneously received in a form of the differential RSRP; an RSRP for a first type of reference signal is received in the form of the differential RSRP, and an RSRP for a second type of reference signal is received directly; for different reference signal sets configured by the second communication node, RSRPs for the different reference signal sets are respectively received in the form of the differential RSRP; and for different reference signal groups received by the first communication node, RSRPs for the different reference signal groups are respectively received in the form of the differential RSRP.

In an embodiment, the RSRP is received in the form of the differential RSRP in at least one of the following conditions: a reference signal type of the reference signal is a specified reference signal type; and the number of the reference signals is greater than or equal to a predetermined threshold.

In an embodiment, before the step S504, the method may further include: a report mode for receiving the information related to the reference signal is configured to the first communication node. The report mode includes at least one of the followings: a first report mode and a second report mode. A relationship between the first report mode and the second report mode includes at least one of the followings: a configuration priority of the first report mode is higher than a configuration priority of the second report mode; a threshold value for limiting and receiving the information related to the reference signal in the first report mode is smaller than a threshold value for limiting and receiving the information related to the reference signal in the second report mode; in the first report mode, information related to all reference signals configured by the second communication node for the first communication node is received by the second communication node; and in the second report mode, the number of information related to the reference signal for the second communication node is smaller than or equal to the number of feedback information related to the reference signal configured by the second communication node for the first communication node.

In an embodiment, in a case where the report mode is the first report mode, an ordinal position of the RSRP of the reference signal is used for indicating the reference signal related index of the reference signal.

In an embodiment, in the first report mode and the second report mode, the RSRP is respectively received in the form of the differential RSRP. The RSRP is received directly in the first report mode, and the RSRP is received in the form of the differential RSRP in the second report mode. The RSRP is received directly in the second report mode, and the RSRP is received in the form of the differential RSRP in the first report mode.

In an embodiment, in a case where the RSRP is respectively received in the form of the differential RSRP in the first report mode and the second report mode, a step value of a differential RSRP in differential reporting of the first report mode is different from a step value of a differential RSRP in differential reporting of the second report mode, or, the step value of the differential RSRP in the differential reporting of the first report mode and the step value of the differential RSRP in the differential reporting of the second report mode are respectively allocated.

In an embodiment, an execution main body of the steps in the embodiment shown in FIG. 5 may be the second communication node such as an eNB but is not limited thereto.

Figure 6:
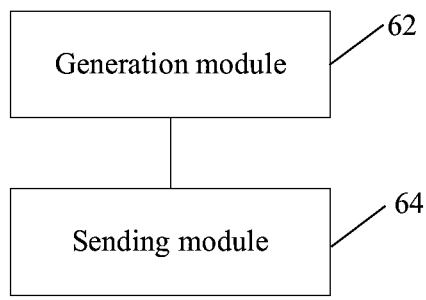
FIG. 6 is a first structural block diagram of an information sending device provided by an embodiment of the disclosure.

FIG. 6 is a first structural block diagram of an information sending device provided by an embodiment of the disclosure. As shown in FIG. 6, the device is located in a first communication node, and includes: a generation module 62 and a sending module 64.

The generation module 62 is configured to generate first signaling in a case where K elements in a beam-related parameter set exceed a first threshold corresponding to the K elements.

The sending module 64 is connected to the generation module 62 and configured to send the first signaling to a second communication node, wherein the first signaling carries information related to a reference signal, wherein the K is an integer greater than or equal to 1.

Through the above device, as first signaling carrying information related to a reference signal is generated in a case where K elements in a beam-related parameter set exceed a first threshold corresponding to the K elements, and the first signaling is sent to a second communication node, that is, the information related to the reference signal is reported in an active reporting manner, a problem on how to report the information related to the reference signal may be solved.

In an embodiment, the sending module 62 is further configured to send the first signaling to the second communication node via at least one of the followings: a PUCCH and a PRACH, wherein the PRACH includes: a contention-based PRACH or a contention-free PRACH.

In an embodiment, the information related to the reference signal includes at least one of the followings: a reference signal index, channel state information, and an RSRP.

In an embodiment, the first signaling directly carries the information related to the reference signal or a position of a time-frequency code resource used by the first signaling indicates the information related to the reference signal.

In an embodiment, before the step S204, the device may further include: a receiving module, connected to the sending module 64 and the receiving module is configured to receive at least one of the following threshold information configured by the second communication node for the first communication node: a first signaling number-of-times threshold, wherein in a case where the number of sending times of the first signaling exceeds the first signaling number-of-times threshold, the first signaling is stopped to be sent; and a cumulative time threshold, wherein in a case where a time duration between a timing start point of a timing unit and a moment for sending the first signaling exceeds the cumulative time threshold, the first signaling is stopped to be sent. By configuring a threshold of the active reporting manner, that is, limiting a configuration of the active reporting manner, the reporting efficiency can be improved.

In an embodiment, the sending module 64 is further configured to execute at least one of the followings: send, in a case where the number of sending times of the first signaling exceeds the first signaling number-of-times threshold and/or the timing duration of the timing unit exceeds the cumulative time threshold, specified information to a high layer; send, in a case where a response message of the first signaling that is sent by the second communication node is not received within first predetermined time after the first signaling is sent for the first signaling number-of-times threshold, the specified information to the high layer; and enable the high layer to send the specified information within second predetermined time after the timing duration of the timing unit exceeds the cumulative time threshold.

In an embodiment, the specified information includes at least one of the following information: information for indicating beam recovery failure; and a trigger condition for a wireless link failure.

In an embodiment, the timing start point is one of the followings: a moment when the link or beam failure is detected; a marking moment of a time window where the moment when the link or beam failure is detected is located; a moment when a beam failure detection result reaches a preset threshold; a marking moment of a time window where the moment when the beam failure detection result reaches the preset threshold is located; a moment for sending the first signaling for a first time; a marking moment of a time window where the moment for sending the first signaling for the first time is located; a moment for configuring an uplink resource for bearing the first signaling; a marking moment of a time window where the moment for configuring the uplink resource for bearing the first signaling is located; a moment for sending the reference signal index borne on the first signaling; a marking moment of a time window where the moment for sending the reference signal index borne on the first signaling is located; a moment when the PUCCH is used for a first time to send the first signaling; a marking moment of a time window where the moment when the PUCCH is used for the first time to send the first signaling is located; a moment when the PRACH is used for a first time to send the first signaling; and a marking moment of a time window where the moment when the PRACH is used for the first time to send the first signaling is located.

In an embodiment, the marking time of the time window includes one of the followings: a start moment of the time window, a middle moment of the time window, and an end moment of the time window.

In an embodiment, the number of sending times of the first signaling includes at least one of the followings: the number of times for sending the first signaling by using a PUCCH resource; the number of times for sending the first signaling by using a PRACH resource; and a sum of the number of times for sending the first signaling by using the PRACH resource and the number of times for sending the first signaling by using the PUCCH resource.

In an embodiment, in a case where a reference signal associated with N PRACHs meets a channel pattern condition, the N PRACH resources are allocated in a same time domain unit or the N PRACHs support FDM, wherein the time domain unit includes at least one of the followings: a time slot, a subframe, a symbol and a symbol set.

In an embodiment, the reference signal includes at least one of the followings: a CSI-RS, and an SS block.

In an embodiment, the device further includes: a determination module, connected to the sending module 64 and configured to determine the PRACH resource of the first signaling via at least one of the following manners: a time domain position of the PRACH resource occupied by the first signaling is determined via a time domain position of a PRACH that is accessed initially and corresponding to an SS block associated with the PRACH of the first signaling; the PRACH resource occupied by the first signaling is determined via a PRACH resource that is accessed initially and corresponding to an SS block associated with the PRACH of the first signaling; the time domain position of the PRACH resource occupied by the first signaling is determined via a time domain position of a PRACH that is accessed initially and corresponding to an SS block meeting a same channel pattern condition; the PRACH resource occupied by the first signaling is determined via the PRACH resource that is accessed initially and corresponding to the SS block meeting the same channel pattern condition; a time domain offset of the PRACH that is accessed initially and corresponding to the SS block associated with the PRACH of the first signaling is the same as a time domain offset of the PRACH resource occupied by the first signaling; a time-frequency offset of the PRACH that is accessed initially and corresponding to the SS block associated with the PRACH of the first signaling is the same as a time-frequency offset of the PRACH resource occupied by the first signaling; a time domain offset of the PRACH that is accessed initially and corresponding to the SS block meeting the same channel pattern condition is the same as a time domain position of the PRACH resource occupied by the first signaling; and a time-frequency offset of the PRACH that is accessed initially and corresponding to the SS block meeting the same channel pattern condition is the same as a time-frequency position of the PRACH resource occupied by the first signaling. The SS block meeting the same channel pattern condition is an SS block of a CSI-RS associated with the PRACH occupied by the first signaling.

In an embodiment, the device further includes: a receiving module, connected to the sending module 64 and configured to execute at least one of the followings: receive second signaling sent by the second communication node, wherein the second signaling carries a predetermined PRACH resource, the predetermined PRACH resource is a PRACH resource selected from a configured or pre-defined PRACH resource set, and the predetermined PRACH resource is used for indicating a time domain and/or frequency domain position of the PRACH resource occupied by the first signaling; and third signaling is sent to the first and second communication nodes, wherein the third signaling carries a predetermined CSI-RS resource and/or SS block associated with the PRACH resource of the first signaling, the predetermined CSI-RS resource and/or SS block is selected from a configured or pre-defined CSI-RS resource set and/or SS block set, and the predetermined CSI-RS resource and/or SS block is associated with the PRACH resource occupied by the first signaling.

In an embodiment, the PRACH resource occupied by the first signaling is a PRACH resource that is accessed initially and corresponding to the SS block associated with the PRACH occupied by the first signaling; and the PRACH resource occupied by the first signaling is a PRACH resource that is accessed initially and corresponding to the SS block, meeting the same channel pattern condition, of the CSI-RS of the PRACH occupied by the first signaling.

In an embodiment, the second signaling includes a first bitmap, wherein when a value of a bit in the first bitmap is equal to a first specified value, a PRACH resource corresponding to the bit in the PRACH resource set is selected. The third signaling includes a second bitmap. When a bit in the second bitmap is at a second specified value, a CSI-RS resource and/or an SS block corresponding to the bit in the CSI-RS resource set and/or the SS block set is selected.

In an embodiment, the receiving module is further configured to receive a frequency domain step value configured by the second communication node, wherein the frequency domain step value is used for indicating a frequency domain interval between PRACHs in a same time domain unit.

In an embodiment, configuration information for the first signaling sent via the PUCCH is the same as configuration information for the first signaling sent via the PRACH, wherein the configuration information includes at least one of the followings: a duration of a response window of the second communication node; a time offset between the response window of the second communication node and time for sending the first signaling to the second communication node; a CORESET resource; and a search space.

Figure 7:
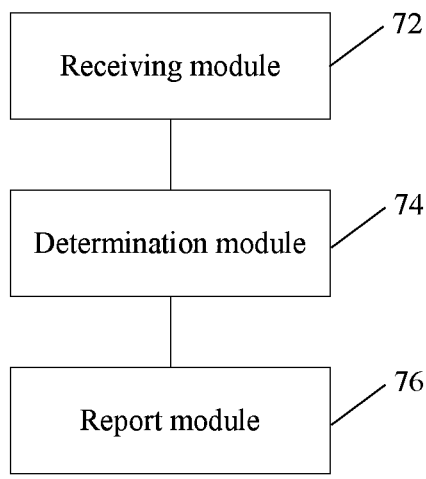
FIG. 7 is a second structural block diagram of an information sending device provided by an embodiment of the disclosure.

The embodiments of the disclosure further provide an information sending device, which is applied to a first communication node. FIG. 7 is a second structural block diagram of an information sending device provided by an embodiment of the disclosure. As shown in FIG. 7, the device includes: a receiving module 72, a determination module 74 and a report module 76.

The receiving module 72 is configured to receive a reference signal sent by a second communication node.

The determination module 74 is connected to the receiving module 72, and the determination module 74 is configured to determine information related to the reference signal, wherein the information includes at least one of the followings: information of a reference signal related index, and information of an RSRP.

The report module 76 is connected to the determination module 74, and configured to feed back the information to the second communication node.

Through the above device, upon the reception of a reference signal sent by a second communication node, information related to the reference signal is sent to the second communication node, that is, the information related to the reference signal is reported in a manner indicated by the second communication node, a problem on how to report the information related to the reference signal may be solved.

In an embodiment, the number of the reference signal related indexes included in the information is smaller than or equal to feedback number of the reference signal related indexes configured by the second communication node for the first communication node.

In an embodiment, in a case where at least one of the following conditions is met, the information includes the reference signal related index: a difference value of an RSRP of the reference signal relative to a maximum RSRP is smaller than or equal to a first threshold; a difference value of the RSRP of the reference signal relative to a maximum RSRP in a group where the reference signal is located is smaller than or equal to a second threshold; a difference value of the RSRP of the reference signal relative to an RSRP of a specified reference signal is smaller than or equal to a third threshold; a difference value of the RSRP of the reference signal relative to a reference power for calculating a differential RSRP is smaller than or equal to a fourth threshold; and the RSRP of the reference signal is greater than or equal to a fifth threshold.

In an embodiment, the first threshold, the second threshold, the third threshold and the fifth threshold are determined via one of the following manners: a value configured by the second communication node, and a pre-defined value. The fourth threshold is determined via one of the following manners: a value configured by the second communication node, a value determined by a variation range of the differential RSRP, and a pre-defined value.

In an embodiment, the information includes: first information and second information, wherein the first information includes at least one of the followings: the number of the reference signal related indexes; the number of the reference signal groups; a group index of the reference signal group; a maximum RSRP value in each reference signal group; a maximum RSRP in RSRPs of all reference signals; a reference power for calculating a differential RSRP; a reference signal related index associated with the reference power for calculating the differential RSRP; a reference signal related index specified by the second communication node; and an RSRP value of a reference signal specified by the second communication node. The second information includes at least one of the followings: the reference signal related index, and the RSRP.

In an embodiment, the RSRP included in the second information is the differential RSRP.

In an embodiment, the reference signal related index included in the second information is indicated by a bitmap.

In an embodiment, the report module 76 is further configured to feed back the first information and the second information via one of the following manners: the first information and the second information are fed back by using the PUCCH resource; the first information and the second information are fed back by using the PUSCH resource; and the first information is fed back by using the PUCCH resource, and the second information is fed back by using the PUSCH resource.

In an embodiment, in a case where the first information is fed back by using the PUCCH resource, and the second information is fed back by using the PUSCH resource, one of the followings is included: the second communication node has no capability of configuring the first information, wherein the first information is used for instructing the first communication node to feed back an RSRP in a differential RSRP manner; the second communication node has the capability of configuring the first information; the second communication node does not configure the first information for the first communication node; and the second communication node configures the first information for the first communication node.

In an embodiment, a modulation coding manner of the first information is different from a modulation coding manner of the second information.

In an embodiment, the report module 76 is further configured to execute at least one of the followings: in a case where the reference signal is X reference signals in the reference signal group, an RSRP corresponding to the X reference signals is fed back in a form of the differential RSRP; in a case where Y reference signals are selected from each reference signal group in D reference signal groups, and the reference signal is selected reference signal, an RSRP corresponding to the selected reference signal is fed back in the form of the referential RSRP; and in a case where the reference signal is J reference signals, an RSRP corresponding to the J reference signals is fed back in the form of the differential RSRP. The X, the Y, the D and the J are positive integers greater than or equal to 1.

In an embodiment, in the case where the reference signal is the X reference signals in the reference signal group, the reference power for calculating the differential RSRP of the X reference signals includes at least one of the followings: an RSRP of a specified reference signal in the reference signal group; an RSRP of a specified reference signal out of the reference signal group; a reference value configured by the second communication node for calculating the differential RSRP; and an RSRP of a specified reference signal in the X reference signals.

In an embodiment, in the case where Y reference signals are selected from each reference signal group in D reference signal groups, and the reference signal is the selected reference signal, the reference power for calculating the differential RSRP of the selected reference signal includes at least one of the followings: an RSRP of a specified reference signal in the D reference signal groups; an RSRP of a specified reference signal out of the D reference signal groups; a reference value configured by the second communication node for calculating the differential RSRP; and an RSRP of a specified reference signal in the Y reference signal of the D reference signal groups.

In an embodiment, in the case where the reference signal is J reference signals, the reference power for calculating the differential RSRP of the J reference signals includes at least one of the followings: an RSRP of a specified reference signal in the J reference signals; a reference value configured by the second communication node for calculating the differential RSRP; and an RSRP of a specified reference signal out of the J reference signals.

In an embodiment, in a case where the specified reference signal is located in one or more specified reference signal groups, the specified reference signal is a reference signal having a maximum or minimum RSRP in the one or more specified reference signal groups; or, the specified reference signal is a reference signal having a maximum or minimum RSRP in all reference signals.

In an embodiment, the step value of the differential RSRP is determined via at least one of the following manners: the step value is determined according to a pre-defined step value; the step value is determined according to the reference power for calculating the differential RSRP; and the step value is determined according to the reference power for calculating the differential RSRP and a threshold value configured by the second communication node. In a case where multiple differential RSRPs are fed back via multiple identifiers, the step value of the differential RSRP is a difference between a first differential RSRP indicated by a first identifier in the multiple identifier and a second differential RSRP indicated by a second identifier in the multiple identifier. The first identifier is adjacent to the second identifier.

In an embodiment, the first identifier may be a numeral and may also be a letter but is not limited thereto.

In an embodiment, the first identifier of the numeral is used as an example for description, that is, the above multiple differential RSRPs may be fed back via a numeral manner. For example, 5 differential RSRPs are fed back by using numerals 12345, the differential RSRP identified by the numeral 2 is a value obtained by adding the step value to the differential RSRP identified by the numeral 1, the differential RSRP identified by the numeral 3 is a value obtained by adding the step value to the differential RSRP identified by the numeral 2, and so on.

In an embodiment, the report module 76 is further configured to feed back the differential RSRP via at least one of the followings: for different types of reference signals, RSRPs for the different types of reference signals are respectively fed back in a form of the differential RSRP; for different types of reference signals, RSRPs for the different types of reference signals are simultaneously fed back in a form of the differential RSRP; ala RSRP for a first type of reference signal is fed back in the form of the differential RSRP, and an RSRP for a second type of reference signal is fed back directly; for different reference signal sets configured by the second communication node, RSRPs for the different reference signal sets are respectively fed back in the form of the differential RSRP; and for different reference signal groups fed back by the first communication node, RSRPs for the different reference signal groups are respectively fed back in the form of the differential RSRP.

In an embodiment, the report module 76 is further configured to feed back the RSRP in the form of the differential RSRP in at least one of the following conditions: a reference signal type of the reference signal is a specified reference signal type; and the number of the reference signals is greater than or equal to a predetermined threshold.

In an embodiment, the device further includes: an obtaining module, connected to the determination module 74, and configured to obtain a report mode configured by the second communication node and used for feeding back the information related to the reference signal is obtained. The report mode includes at least one of the followings: a first report mode and a second report mode. A relationship between the first report mode and the second report mode includes at least one of the followings: a configuration priority of the first report mode is higher than a configuration priority of the second report mode; a threshold value for limiting and feeding back the information related to the reference signal in the first report mode is smaller than a threshold value for limiting and feeding back the information related to the reference signal in the second report mode; in the first report mode, information related to all reference signals configured by the second communication node for the first communication node is fed back to the second communication node; and in the second report mode, the number of information related to the reference signal for the second communication node is smaller than or equal to the number of feedback information related to the reference signal configured by the second communication node for the first communication node.

In an embodiment, in a case where the report mode is the first report mode, an ordinal position of the RSRP of the reference signal is used for indicating the reference signal related index of the reference signal.

In an embodiment, in the first report mode and the second report mode, the RSRP is respectively fed back in the form of the differential RSRP. The RSRP is fed back directly in the first report mode, and the RSRP is fed back in the form of the differential RSRP in the second report mode. The RSRP is fed back directly in the second report mode, and the RSRP is fed back in the form of the differential RSRP in the first report mode.

In an embodiment, in a case where the RSRP is respectively fed back in the form of the differential RSRP in the first report mode and the second report mode, a step value of a differential RSRP in differential reporting of the first report mode is different from a step value of a differential RSRP in differential reporting of the second report mode, or, the step value of the differential RSRP in the differential reporting of the first report mode and the step value of the differential RSRP in the differential reporting of the second report mode are respectively allocated.

Figure 8:
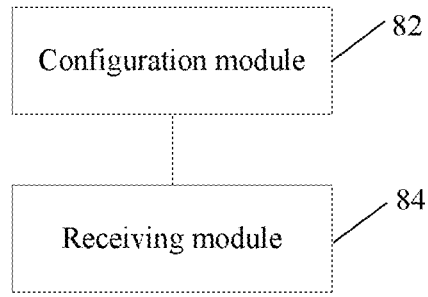
FIG. 8 is a first structural block diagram of an information receiving device provided by an embodiment of the disclosure.

The embodiments of the disclosure provide an information receiving device, which is applied to a second communication node. FIG. 8 is a second structural block diagram of an information receiving device provided by an embodiment of the disclosure. As shown in FIG. 8, the device includes: a configuration module 82 and a receiving module 84.

The configuration module 82 is configured to configure at least one of the following information to a first communication node: a first signaling number-of-times threshold, wherein in a case where the number of sending times of the first signaling exceeds the first signaling number-of-times threshold, the first signaling is stopped to be sent; a cumulative time threshold, wherein in a case where a time duration between a timing start point of a timing unit and a moment for sending the first signaling exceeds the cumulative time threshold, the first signaling is stopped to be sent; a PUCCH; a PRACH; and a beam recovery PRACH.

The receiving module 84 is connected to the configuration module 82, and configured to receive first signaling sent by the first communication node received, wherein the first signaling is signaling generated in a case where K elements in a beam-related parameter set exceed a first threshold corresponding to the K elements, the first signaling carries information related to a reference signal, and the K is an integer greater than or equal to 1.

Through the above device, as first signaling sent by a first communication node and carrying information related to a reference signal is generated in a case where K elements in a beam-related parameter set exceed a first threshold corresponding to the K elements, that is, the information related to the reference signal is reported in an active reporting manner of the first communication node, a problem on how to report the information related to the reference signal may be solved.

In an embodiment, the device may independently include the receiving module 84, and may also simultaneously include the receiving module 84 and the configuration module 82, but is not limited thereto.

In an embodiment, the receiving module 84 is further configured to receive the first signaling via at least one of the following channels: a PUCCH, and a PRACH, wherein the PRACH includes: a contention-based PRACH or a contention-free PRACH.

In an embodiment, the configuration module 82 is further configured to configure the information to the first communication node according to a capability of the first communication node. The capability of the first communication node includes at least one of the followings: a capability of the first communication node for supporting beam correspondence, a capability of the first communication node for supporting non beam correspondence, a capability of the first communication node for supporting partial beam correspondence, and an antenna parameter of the first communication node.

In an embodiment, the information related to the reference signal includes at least one of the followings: a reference signal index, channel state information, and an RSRP.

In an embodiment, the first signaling directly carries the information related to the reference signal or a position of a time-frequency code resource used by the first signaling indicates the information related to the reference signal.

In an embodiment, in a case where a reference signal associated with N PRACHs meets a channel pattern condition, the N PRACH resources are allocated in a same time domain unit or the N PRACHs support FDM, wherein the time domain unit includes at least one of the followings: a time slot, a subframe, a symbol and a symbol set.

In an embodiment, the reference signal includes at least one of the followings: a CSI-RS, and an SS block.

In an embodiment, the device may further include at least one of the followings: a sending module, connected to the receiving module 84, and configured to send second signaling to the first communication node, wherein the second signaling carries a predetermined MACH resource, the predetermined PRACH resource is a PRACH resource selected from a configured or pre-defined PRACH resource set, and the predetermined PRACH resource is used for indicating a time domain and/or frequency domain position of the PRACH resource occupied by the first signaling; and send third signaling to the first and second communication nodes, wherein the third signaling carries a predetermined CSI-RS resource and/or SS block associated with the PRACH resource of the first signaling, the predetermined CSI-RS resource and/or SS block is selected from a configured or pre-defined CSI-RS resource set and/or SS block set, and the predetermined CSI-RS resource and/or SS block is associated with the PRACH resource occupied by the first signaling.

In an embodiment, the PRACH resource occupied by the first signaling is a PRACH resource that is accessed initially and corresponding to the SS block associated with the PRACH occupied by the first signaling; and the PRACH resource occupied by the first signaling is a PRACH resource that is accessed initially and corresponding to the SS block, meeting the same channel pattern condition, of the CSI-RS of the PRACH occupied by the first signaling.

In an embodiment, the second signaling includes a first bitmap, wherein when a value of a bit in the first bitmap is equal to a first specified value, a PRACH resource corresponding to the bit in the PRACH resource set is selected. The third signaling includes a second bitmap, wherein when a value of a bit in the second bitmap is equal to a second specified value, a CSI-RS resource and/or an SS block corresponding to the bit in the CSI-RS resource set and/or the SS block set is selected.

In an embodiment, the configuration module 82 is further configured to configure a frequency domain step value for the first communication node, wherein the frequency domain step value is used for indicating a frequency domain interval between PRACHs in a same time domain unit.

In an embodiment, configuration information for sending the first signaling sent via the PUCCH is the same as configuration information for sending the first signaling sent via the PRACH, wherein the configuration information includes at least one of the followings: a duration of a response window of the second communication node; a time offset between the response window of the second communication node and time for sending the first signaling to the second communication node a CORESET resource; and a search space.

Figure 9:
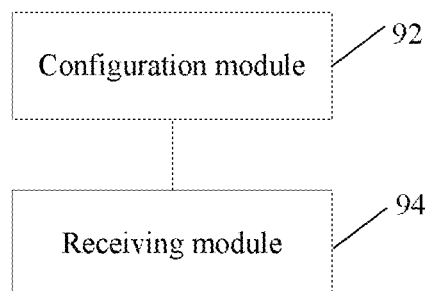
FIG. 9 is a second structural block diagram of an information receiving device provided by an embodiment of the disclosure.

This embodiment further provides an information sending device, which is applied to a second communication node. FIG. 9 is a second structural block diagram of an information receiving device provided by an embodiment of the disclosure. As shown in FIG. 9, the device includes: a sending module 92, and a receiving module 94.

The sending module 92 is configured to send a reference signal to a first communication node.

The receiving module 94 is connected to the sending module 92, and configured to receive information fed back by the first communication node and related to the reference signal, wherein the information includes at least one of the followings: information of a reference signal related index, and information of an RSRP.

Through the above device, upon sending a reference signal to a first communication node, information sent by the first communication node and related to the reference signal is received, that is, the first communication node reports the information related to the reference signal via a manner indicated by a second communication node, a problem on how to report the information related to the reference signal may be solved.

In an embodiment, the number of the reference signal related indexes included in the information is smaller than or equal to feedback number of the reference signal related indexes configured by the second communication node for the first communication node.

In an embodiment, in a case where at least one of the following conditions is met, the information includes the reference signal related index: a difference value of an RSRP of the reference signal relative to a maximum RSRP is smaller than or equal to a first threshold; a difference value of the RSRP of the reference signal relative to a maximum RSRP in a group where the reference signal is located is smaller than or equal to a second threshold; a difference value of the RSRP of the reference signal relative to an RSRP of a specified reference signal is smaller than or equal to a third threshold; a difference value of the RSRP of the reference signal relative to a reference power for calculating a differential RSRP is smaller than or equal to a fourth threshold; and the RSRP of the reference signal is greater than or equal to a fifth threshold.

In an embodiment, the first threshold, the second threshold, the third threshold and the fifth threshold are determined via one of the following manners: a value configured by the second communication node, and a pre-defined value. The fourth threshold is determined via one of the following manners: a value configured by the second communication node, a value determined by a variation range of the differential RSRP, and a pre-defined value.

In an embodiment, the information includes: first information and second information, wherein the first information includes at least one of the followings: the number of the reference signal related indexes; the number of the reference signal groups; a group index of the reference signal group; a maximum RSRP value in each reference signal group; a maximum RSRP in RSRPs of all reference signals; a reference power for calculating a differential RSRP; a reference signal related index associated with the reference power for calculating the differential RSRP; a reference signal related index specified by the second communication node; and an RSRP value of a reference signal specified by the second communication node. The second information includes at least one of the followings: the reference signal related index, and the RSRP.

In an embodiment, the RSRP included in the second information is the differential RSRP.

In an embodiment, the reference signal related index included in the second information is indicated by a bitmap.

In an embodiment, the receiving module 94 receives the first information and the second information fed back by the first communication node via one of the following manners: the first information and the second information are fed back by using the PUCCH resource; the first information and the second information are fed back by using the PUSCH resource; and the first information is fed back by using the PUCCH resource, and the second information is fed back by using the PUSCH resource.

In an embodiment, in a case where the first information is fed back by using the PUCCH resource, and the second information is fed back by using the PUSCH resource, the method further includes one of the followings: the second communication node has no capability of configuring the first information, wherein the first information is used for instructing the first communication node to feed back an RSRP in a differential RSRP manner; the second communication node has the capability of configuring the first information; the second communication node does not configure the first information for the first communication node; and the second communication node configures the first information for the first communication node.

In an embodiment, a modulation coding manner of the first information is different from a modulation coding manner of the second information.

In an embodiment, the receiving module 94 is further configured to execute at least one of the followings: receive, in a case where the reference signal is X reference signals in the reference signal group, an RSRP corresponding to the X reference signals in a form of the differential RSRP; receive, in a case where Y reference signals are selected from each reference signal group in D reference signal groups, and the reference signal is selected reference signal, an RSRP corresponding to the selected reference signal in the form of the referential RSRP; and receive, in a case where the reference signal is J reference signals, an RSRP corresponding to the J reference signals in the form of the differential RSRP. The X, the Y, the D and the J are positive integers greater than or equal to 1.

In an embodiment, in the case where the reference signal is the X reference signals in the reference signal group, the reference power for calculating the differential RSRP of the X reference signals includes at least one of the followings: an RSRP of a specified reference signal in the reference signal group; an RSRP of a specified reference signal out of the reference signal group; a reference value configured by the second communication node for calculating the differential RSRP; and an RSRP of a specified reference signal in the X reference signals.

In an embodiment, in the case where Y reference signals are selected from each reference signal group in D reference signal groups, and the reference signal is the selected reference signal, the reference power for calculating the differential RSRP of the selected reference signal includes at least one of the followings: an RSRP of a specified reference signal in the D reference signal groups; an RSRP of a specified reference signal out of the D reference signal groups; a reference value configured by the second communication node for calculating the differential RSRP; and an RSRP of a specified reference signal in the Y reference signal of the D reference signal groups.

In an embodiment, in the case where the reference signal is J reference signals, the reference power for calculating the differential RSRP of the J reference signals includes at least one of the followings: an RSRP of a specified reference signal in the J reference signals; a reference value configured by the second communication node for calculating the differential RSRP; and an RSRP of a specified reference signal out of the J reference signals.

In an embodiment, in a case where the specified reference signal is located in one or more specified reference signal groups, the specified reference signal is a reference signal having a maximum or minimum RSRP in the one or more specified reference signal groups; or, the specified reference signal is a reference signal having a maximum or minimum RSRP in all reference signals.

In an embodiment, the step value of the differential RSRP is determined via at least one of the following manners: the step value is determined according to a pre-defined step value; the step value is determined according to the reference power for calculating the differential RSRP; and the step value is determined according to the reference power for calculating the differential RSRP and a threshold value configured by the second communication node. In a case where multiple differential RSRPs are fed back via multiple identifiers, the step value of the differential RSRP is a difference between a first differential RSRP indicated by a first identifier in the multiple identifier and a second differential RSRP indicated by a second identifier in the multiple identifier. The first identifier is adjacent to the second identifier.

In an embodiment, the first identifier may be a numeral and may also be a letter but is not limited thereto.

In an embodiment, the first identifier of the numeral is used as an example for description, that is, the above multiple differential RSRPs may be received via a numeral manner. For example, 5 differential RSRPs are received by using numerals 12345, the differential RSRP identified by the numeral 2 is a value obtained by adding the step value to the differential RSRP identified by the numeral 1, the differential RSRP identified by the numeral 3 is a value obtained by adding the step value to the differential RSRP identified by the numeral 2, and so on.

In an embodiment, the receiving module 94 is further configured to receive the differential RSRP via at least one of the followings: respectively receiving, for different types of reference signals, RSRPs for the different types of reference signals in a form of the differential RSRP; simultaneously receiving, for different types of reference signals, RSRPs for the different types of reference signals in a form of the differential RSRP; receiving an RSRP for a first type of reference signal in the form of the differential RSRP, and directly receiving an RSRP for a second type of reference signal; respectively receiving, for different reference signal sets configured by the second communication node, RSRPs for the different reference signal sets in the form of the differential RSRP; and respectively receiving, for different reference signal groups received by the first communication node, RSRPs for the different reference signal groups in the form of the differential RSRP.

In an embodiment, the RSRP is received in the form of the differential RSRP in at least one of the following conditions: a reference signal type of the reference signal is a specified reference signal type; and the number of the reference signals is greater than or equal to a predetermined threshold.

In an embodiment, the device further includes: a configuration module, connected to the receiving module 94, and configured to configure a report mode to the first communication node to receive the information related to the reference signal is obtained. The report mode includes at least one of the followings: a first report mode and a second report mode. A relationship between the first report mode and the second report mode includes at least one of the followings: a configuration priority of the first report mode is higher than a configuration priority of the second report mode; a threshold value for limiting and feeding back the information related to the reference signal in the first report mode is smaller than a threshold value for limiting and feeding back the information related to the reference signal in the second report mode; in the first report mode, information related to all reference signals configured by the second communication node for the first communication node is fed back to the second communication node; and in the second report mode, the number of information related to the reference signal for the second communication node is smaller than or equal to the number of feedback information related to the reference signal configured by the second communication node for the first communication node.

In an embodiment, in a case where the report mode is the first report mode, an ordinal position of the RSRP of the reference signal is used for indicating the reference signal related index of the reference signal.

In an embodiment, in the first report mode and the second report mode, the RSRP is respectively received in the form of the differential RSRP. The RSRP is received directly in the first report mode, and the RSRP is received in the form of the differential RSRP in the second report mode. The RSRP is received directly in the second report mode, and the RSRP is received in the form of the differential RSRP in the first report mode.

In an embodiment, in a case where the RSRP is respectively received in the form of the differential RSRP in the first report mode and the second report mode, a step value of a differential RSRP in differential reporting of the first report mode is different from a step value of a differential RSRP in differential reporting of the second report mode, or, the step value of the differential RSRP in the differential reporting of the first report mode and the step value of the differential RSRP in the differential reporting of the second report mode are respectively allocated.

In an embodiment, the device may be located in the second communication node such as an eNB but is not limited thereto.

In an embodiment, each module may be implemented by software or hardware. The latter may be implemented via the following manner but is not limited thereto: the above modules are located in the same processor; or the above modules are respectively located in different processors in any combined form.

The embodiments of the disclosure further provide a storage medium; the storage medium includes a stored program; and the program executes, when running, the information sending and receiving method provided by the embodiments of the disclosure.

In an embodiment, the storage medium may include but not limited to: various media capable of storing a program code such as a U disk, an ROM, an RAM, a mobile hard disk, a magnetic disk or an optical disc.

The embodiments of the disclosure further provide a processor; the processor is configured to run a program; and the program executes, when running, the above information sending and receiving method provided by the embodiments of the disclosure.

In an embodiment, the reference signal at least includes one of the followings: Cell-specific Reference Signals (CRS), a Channel State Information-Reference Signal (CSI-RS), a beam managing CSI-RS, a Channel State Information Interference Measurement (CSI-IM) signal, a Demodulation Reference Signal (DMRS), a downlink demodulation reference signal, an uplink demodulation reference signal, a Sounding Reference Signal (SRS), Phase-Tracking Reference Signals (PT-RS), a Mobile Reference Signal (MRS), a Beam Reference Signal (BRS), a Beam Refining Reference Signal (BRRS), Random Access Channel (RACH), a Synchronization Signal (SS), a SS block, a Primary Synchronization Signal (PSS), and a Secondary Synchronization Signal (SSS).

The channel pattern may include a physical transmission channel pattern, such as a horizontal sending azimuth angle, a perpendicular sending azimuth angle, a horizontal receiving azimuth angle and a perpendicular receiving azimuth angle, and may also include a pattern of an RF and baseband circuit, such as an antenna element pattern, an antenna placement, a time offset and a frequency offset of a baseband, and a phase noise.

In an embodiment, the beam may be a resource (including one or a combination of the followings: a sending-end precoding, a receiving-end precoding, an antenna port, a reference signal resource, an antenna weight vector, an antenna weight matrix, etc.). The beam index or symbol may be replaced as a resource index because the beam may be bound with some time-frequency code resources for transmission. The beam may also be a transmission (sending/receiving) manner. The transmission manner may include space division multiplexing, frequency domain/time domain diversity, etc.

The receiving beam indication can be indicated by the sending end via a current reference signal, an antenna port, a reference signal (or a base reference signal) fed back and reported by the UE, and a Quasi Co-Located (QCL) assumption of the antenna port.

The receiving beam refers to a beam of the receiving end that does not need to be indicated, or a beam resource of the receiving end that may be indicated by the sending end via the current reference signal, the antenna port, the reference signal (or the base reference signal) fed back and reported by the UE and the QCL of the antenna port.

The parameter related to the QCL at least includes Doppler spread, Doppler translation, time delay spread, an average time delay, an average gain, a spatial parameter and a spatial receiving parameter.

In an embodiment, feeding back by using the differential RSRP is equivalent to feeding back the RSRP in the form of the differential RSRP.

This embodiment provides a method for feeding back channel related information, which focuses on that a user in a trigger condition actively feeds back channel quality information (equivalent to the information related to the reference signal in the above embodiment), and is applied to a first communication node (that is, a UE side). The method includes: first signaling is generated according to a first trigger threshold for K elements in a beam-related parameter set, wherein the K is an integer greater than or equal to 1; and the first signaling is sent to the first communication node. This process may also be referred to as beam recovery, or active beam reporting of the user.

The beam-related parameter set is used for the channel quality determination. The beam-related parameter set includes at least one of the followings: quality of N first beam links; a difference or a ratio between the quality of the N first beam links and quality of K second beam links; correlation among time-frequency channel responses for the N first beam links and the K second beam links, or correlation among frequency domain channel responses for the N first beam links and the K second beam links, and correlation among space domain for the N first beam links and the K second beam links; a difference or a ratio between azimuth angles of the N first beam links and azimuth angles of the K second beam links; quality of the K second beam links; quality of all second beam links; time cumulation from previous successful reception of an uplink control channel or a data channel; the number of cumulative times of unsuccessful reception; adjustment information of beam grouping; and a weight value or a weight related value of each parameter included in the beam-related parameter set. In an embodiment, the channel quality determination may be a determination threshold in which an element in the beam-related parameter set is required to be triggered continuously for C times, wherein the C is an eNB configured variable, or a pre-defined variable, wherein the C is a positive integer greater than or equal to 1.

The second beam link is from S configured beam link sets, or from activated S1 sets in the S configured beam link sets. In an embodiment, the first beam link refers to a serving beam.

The first beam link is either from the S configured beam link sets or from the activated S1 sets in the S configured beam link sets, or is a configured optional beam. In an embodiment, the second beam link refers to a candidate beam.

The configured beam link refers to a beam link reported by the first communication node to the second communication node, or a beam link instructed by the second communication node to the first communication node.

The N, the S and the S1 are integers greater than or equal to 1, and the S1 is smaller than or equal to the S.

In an embodiment, the beam link is corresponding to one of the followings: a sending beam, a receiving beam, a transceiving beam pair, a beam group, a receiving beam group, a sending beam group, a receiving mode, an antenna combination, a control channel, a downlink reference signal and an uplink reference signal.

The quality of the beam link includes at least one or combination of the followings: a Block Error Ratio (BLER), a receiving signal power, an RSRP, an RSRQ, a channel capacity, a signal to interference and noise ratio of the receiving end, and a signal-noise ratio of the receiving end.

In addition, the first signaling may be referred to as beam recovery request signaling, and includes a reference signal index, an optional beam sequence number or associated channel state information (such as the RSRP). The first signaling may be transmitted via one or a combination of the following transmission channels: a PUCCH and a PRACH, wherein the PRACH is a contention-based PRACH or a contention-free exclusive PRACH.

Figure 10:
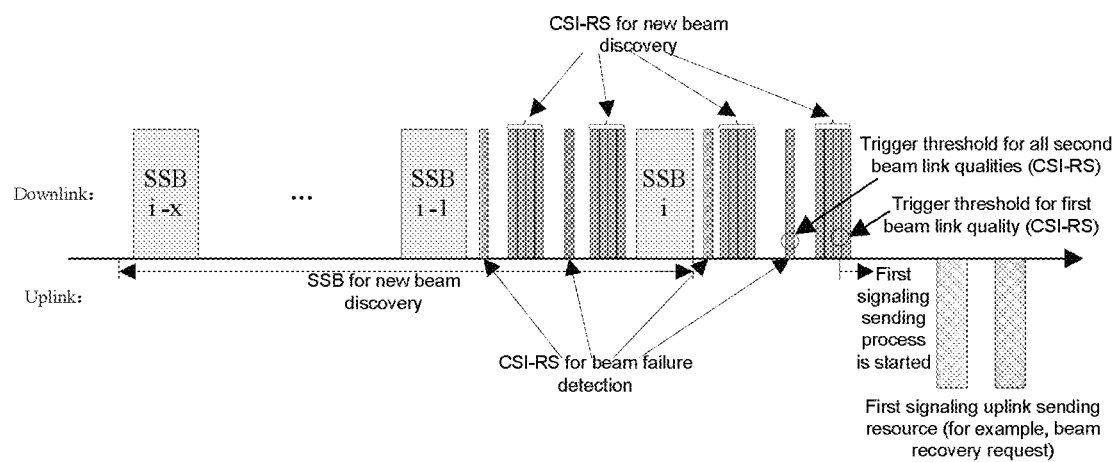
FIG. 10 is a flowchart schematic diagram for channel quality feedback based on a trigger condition provided by an embodiment of the disclosure.

FIG. 10 is a flowchart schematic diagram for channel quality feedback based on a trigger condition provided by an embodiment of the disclosure. An eNB configures a periodic CSI-RS for detecting beam failure. In a case where the BLER performance associated with the CSI-RS is greater than or equal to a determination threshold, a UE determines beam failure detection. Additionally, the eNB configures an SS Block (SSB) and a periodic CSI-RS resource to form first beam link quality. In a case where channel quality (such as a BLER or an RSRP) associated with one CSI-RS resource in the first beam link quality triggers the threshold, the UE declares to discover a new candidate beam.

When all second beam link qualities (CSI-RS) trigger the threshold and one first beam link quality (such as the CSI-RS, or the SS block) triggers the threshold, a user may start a first signaling sending process, that is, first signaling, like beam recovery request signaling, may be sent on a corresponding uplink resource.

In an embodiment, based on a restriction condition for sending the first signaling, with a view to a case where a trigger condition is met or there is beam failure, the user may select a new available beam from a candidate beam set (that is, configured optional beams, the first beam links). However, it is necessary to restrict a behavior of the user side, so that the UE may be guaranteed to quickly execute the beam recovery process under effective time restriction and number-of-times restriction, thus assuring the beam recovery performance, and preventing that the beam recovery time is too long and the UE waits for an effective beam for a long time.

The first signaling includes one or a combination of the following configuration information: a first signaling number-of-times threshold, and a cumulative time threshold.

In an embodiment, the configuration restriction condition is as follows: in a case where the configuration information is the first signaling number-of-times threshold, when the number of times for the first signaling exceeds the first signaling number-of-times threshold, the second communication node stops sending the first signaling; or, in a case where the configuration information is the cumulative time threshold, when an associated timing unit exceeds the cumulative time threshold, the second communication node stops sending the first signaling; or, in a case where the configuration information is the cumulative time threshold and the first signaling number-of-times threshold, when the associated timing unit exceeds the cumulative time threshold, and/or, the number of times for the first signaling exceeds the first signaling number-of-times threshold, the second communication node stops sending the first signaling.

In addition, considering that the first signaling cannot be sent effectively (that is, in case of the failure of the beam recovery), at least one of the followings is further included: after the number of times and/or the cumulative time that the second communication node sends the first signaling to the first communication node exceed a threshold, the second communication node notifies a high layer of type-A information; and within Y time units after the number of times and/or the cumulative time that the second communication node sends the first signaling to the first communication node exceed the threshold, the second communication node notifies the high layer of the type-A information, wherein the Y is an integer greater than or equal to 0. The type-A information represents a trigger condition for the failure of the beam recovery and/or the failure of the wireless link.

It is to be noted that, regarding restriction on a start point for calculating the cumulative time, for the restriction for sending the first signaling, the start point of the cumulative time may be one of the followings: 1) a moment when the failure of the associated link or beam is detected, or a marking moment of a time window associated with the moment when the failure of the associated link or beam is detected; 2) a moment when a beam failure detection result triggers the threshold, or a marking moment of a time window associated with the moment when the beam failure detection result triggers the threshold; 3) a moment for sending the first signaling for a first time, or a marking moment of a time window associated with the moment for sending the first signaling for the first time; 4) a moment when the second communication node configures an uplink resource for bearing the first signaling, or a marking moment of a time window associated with the moment when the second communication node configures the uplink resource for bearing the first signaling is located; 5) a moment for sending the reference signal index borne on the first signaling, or a marking moment of a time window associated with the moment for sending the reference signal index home on the first signaling; 6) a moment when the PUCCH is used for a first time to send the first signaling, or a marking moment of a time window associated with the moment when the PUCCH is used for the first time to send the first signaling; and 7) a moment when the PRACH is used for a first time to send the first signaling, or a marking moment of a time window associated with the moment when the PRACH is used for the first time to send the first signaling. The marking time of the time window refers to a start moment of the time window, or a middle moment, or an end moment.

In an embodiment, the number of sending times for the first signaling includes at least one of the followings: 1) the number of sending times for the first signaling refers to the number of times for sending the first signaling by using a PUCCH resource; 2) the number of sending times for the first signaling refers to number of times for sending the first signaling by using a PRACH resource; and 3) the number of sending times for the first signaling refers to a sum of the number of times for sending the first signaling by using the PRACH and the number of times for sending the first signaling by using the PUCCH resource.

In an embodiment, based on the method for configuring the MACH resource associated with the first signaling, as the first signaling involves in the use of the PRACH, and the PRACH resource is configured in advance in an initial access stage, the configuration of the PRACH resource for sending the first signaling should be limited for the UE. Additionally, the PRACH is only associated with the SS block during the initial access stage, but for the first signaling, the PRACH may be associated with the CSI-RS, the SS block or the CSI-RS and the SS block. In this sense, when the eNB is configured with the CSI-RS and the SS block, a certain assumptions of the UE side need to be met, so that the UE supports relevant measurement and reporting of the first signaling.

The restriction on allocation of the PRACH resource supports at least one of the followings: in a case where a downlink reference signal associated with N PRACHs meets a channel pattern assumption, the N PRACH resources are allocated in a same time domain unit, or support FDM. The first communication node does not expect that when the associated downlink reference signal meets the channel pattern assumption, the PRACHs are allocated in different time domain units. The time domain unit includes a time slot, a subframe, a symbol or a symbol set. In an embodiment, the downlink reference signal includes one or a combination of the followings: the CSI-RS and the SS block.

The PRACH resource has the following patterns, including at least one of the followings: a time domain position of the PRACH resource of the first signaling is determined according to a time domain position of a PRACH that is accessed initially and corresponding to an SS block associated with the PRACH of the first signaling, wherein the time domain position of the PRACH that is accessed initially is implemented by configuration signaling of the PRACH that is accessed initially and sent by the first communication node to the second communication node. The time domain position is time domain offset information.

A PRACH resource of the first signaling is determined according to a PRACH resource that is accessed initially and corresponding to the SS block associated with the PRACH of the first signaling. A time domain position of the PRACH resource of the first signaling is determined according to a time domain position of a PRACH that is accessed initially and corresponding to an SS block, meeting a same channel pattern assumption, of a CSI-RS associated with the PRACH of the first signaling. The PRACH resource of the first signaling is determined according to a PRACH resource that is accessed initially and corresponding to an SS block, meeting the same channel pattern assumption, of the CSI-RS associated with the PRACH of the first signaling.

The first communication node does not expect that a time domain offset of the PRACH that is accessed initially and corresponding to the SS block associated with the PRACH of the first signaling is different from a time domain offset of the PRACH resource of the first signaling; or, the first communication node does not expect that a time-frequency offset of the PRACH that is accessed initially and corresponding to the SS block associated with the PRACH of the first signaling is different from a time-frequency offset of the PRACH resource of the first signaling.

A reference of the time-frequency offset may be an OFDM symbol (or a first Resource Element (RE) of the OFDM symbol) where a first SS block of each SS block burst is located, or a first RE of a Bandwidth Part (BWP) where the first SS block is located.

The first communication node does not expect that a time domain offset of the PRACH that is accessed initially and corresponding to the SS block, meeting the same channel pattern assumption, of the CSI-RS associated with the PRACH of the first signaling is different from the time domain offset of the PRACH resource of the first signaling; or, the first communication node does not expect that a time-frequency offset of the PRACH that is accessed initially and corresponding to the SS block, meeting the same channel pattern assumption, of the CSI-RS associated with the PRACH of the first signaling is different from the time-frequency offset of the PRACH resource of the first signaling.

In an embodiment, a part of sets are selected from pre-configured sets for PRACH-beam recovery, with the pattern including at least one or a combination of the followings: the second communication node sends second signaling to the first communication node, to indicate V PRACH resources in configured or pre-defined PRACH resources for indicating a time domain and/or frequency domain position of the PRACH resource associated with the first signaling; the second communication node sends third signaling to the first communication node, to indicate T CSI-RS resources and/or SS blocks from configured or pre-defined CSI-RS resources and/or SS blocks for correspondence with the PRACH resource of the first signaling; and the PRACH associated with the first signaling uses the PRACH resource that is accessed initially and corresponding to the SS block associated with the PRACH of the first signaling; or, the first communication node has the following default configurations: the PRACH associated with the first signaling uses the PRAH resource that is accessed initially and corresponding to the SS block associated with the PRACH of the first signaling; and the PRACH associated with the first signaling uses the PRACH resource that is accessed initially and corresponding to the SS block, meeting the same channel pattern assumption, of the CSI-RS associated with the PRACH of the first signaling; or the first communication node has the following default configurations: the PRACH associated with the first signaling uses the PRACH resource that is accessed initially and corresponding to the SS block, meeting the same channel pattern assumption, of the CSI-RS associated with the PRACH of the first signaling. The V and the T are an integer greater than or equal to 1. In an embodiment, selecting a special set from existing sets may use a bitmap method. In a case where a bit in the bitmap is assigned as a special value (such as 1), it is showed that the PRACH resource associated with the bit is indicated.

For example, the eNB is configured with 16 periodic CSI-RS resources, in which 4 periodic CSI-RS resources serve a current transmission beam (that is, the second beam link, serving beam), and the rest 12 periodic CSI-RS resources are used to discover a new beam (that is, the first beam link, new candidate beam identification). The bitmap is used to select 4 resources from the configured 16 periodic CSI-RS resources, that is, the bitmap of 16'b1111_0000_0000_0000 represents the second beam link; and additionally, 12 resources in the 16 periodic CSI-RS resources, that is, the bit map of 16'b0000_1111_1111_1111, is used to select the configured additional 12 resources.

In a case where the CSI-RS and the SS block are in a one-to-one corresponding relationship, the PRACH resource associated with the SS block corresponding to the bitmap of 16'b0000_1111_1111_1111 is configured to serve as an exclusive reporting resource of the first signaling.

In a case where every four CSI-RSs are associated with one SS block, the PRACH time-frequency resource associated with the SS block associates the four CSI-RSs. Nevertheless, each CSI-RS is configured or is distinguished by using 4 different sequences according to a pre-defined rule.

Additionally, in a case where multiple CSI-RSs and SS blocks of the QCL are supported to be configured, the PRACH associated with the SS blocks may serve as a reference; and then, the configuration of the CSI-RSs and the SS blocks meeting a QCL relationship is implemented at a special frequency domain step value. Specifically, the second communication node configures the frequency domain step value to the first communication node to indicate a frequency domain interval between PRACHs in a same time domain unit. The multiple CSI-RSs of the QCL use a same sequence. The CSI-RS resources are distinguished by the eNB via different frequency domain resources.

Figures 11, 12:
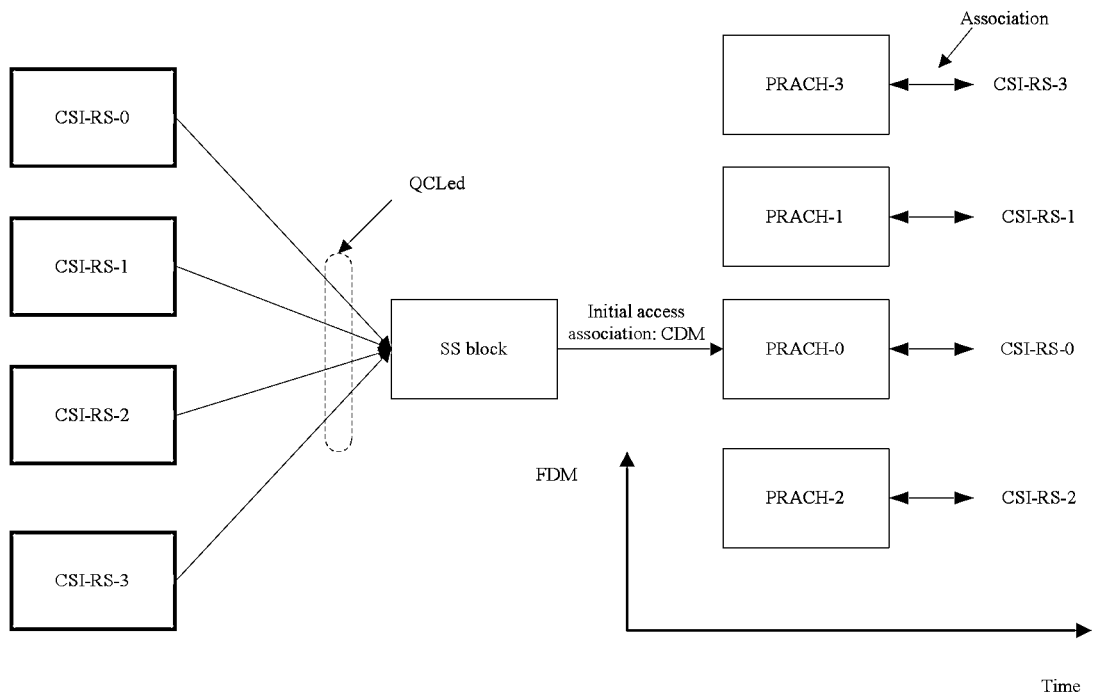
FIG. 11 is a schematic diagram of a method for associating a reference signal and a PRACH resource provided by an embodiment of the disclosure.
FIG. 12 is a first schematic diagram of a beam reporting feedback method provided by an embodiment of the disclosure.

FIG. 11 is a schematic diagram of a method for associating a reference signal and a PRACH resource provided by an embodiment of the disclosure. It is assumed that the system configures 4 CSI-RS resources to serve as the second beam links (that is, new candidate beam identification), and the four CSI-RS resources meet the channel pattern assumption (such as spatial QCL) together with one SS block. According to the method for configuring the SS block and the PRACH during initial access, the CSI-RS resource is in one-to-one mapping with the PRACH having the same time domain resource but a different frequency domain resource. The first CSI-RS is directly associated with the PRACH associated with the SS block, and the other CSI-RSs are sequentially associated with PRACHs at other frequency domain positions. In an embodiment, if only one CSI-RS is configured in the SS block, the PRACH that is defaulted to be associated and meeting the correspondence relationship is PRACH-0 in the figure.

In addition, both the PUCCH and the PRACH may be used to bear the first signaling, may share some same configurations, or use the same configuration or mode and include at least one or a combination of the followings: a duration of a response window of the second communication node; a time offset between the response window of the second communication node and time for sending the first signaling to the second communication node; a CORESET resource; and a search space.

In an embodiment, the first communication node (UE) feeds back, based on a criterion, a behavior smaller than a feedback limit configured by the eNB.

By receiving the reference signal sent by the second communication node (that is, the eNB side), the first communication node (that is, the UE side) determines a reference signal related index, an RSRP, or the reference signal related index and the RSRP. In an embodiment, the reference signal related index, or the RSRP, or the reference signal related index and the RSRP are reported to the second communication node, it is to be noted that the reference signal related index is used to indicate sending beam information and thus the report may be referred to as beam reporting. By indicating the reference signal resource such as the CSI-RS resource or the SS block, indication and reporting of a sending beam or an air filter at the sending end are implemented (for example, an effective beam index is indicated).

It is to be noted that the reference signal received power refers to an RSRP. For the ease of discussion, the RSRP is used below to replace the reference signal received power for description.

During beam reporting, for the feedback number N of the reference signal related indexes configured by the eNB and the number of the reported reference signal related indexes fed back by the UE side, the M is smaller than or equal to the N, and the M and the N are an integer greater than or equal to 0. In an embodiment, the feedback criterion for the reference signal related index includes at least one or a combination of the followings: 1) a difference value of an RSRP associated with the reference signal relative to a maximum RSRP is smaller than or equal to a threshold T-1. In an embodiment, the T-1 is configured by the second communication node, or determined by a variation range of a differential RSRP, or pre-defined in a standard. 2) A difference value of the RSRP associated with the reference signal relative to a maximum RSRP in a group where the reference signal is located or a difference value relative to an RSRP of a special reference signal is smaller than or equal to a threshold T-2. In an embodiment, the T-2 is configured by the second communication node, or determined by a variation range of a differential RSRP, or pre-defined in a standard. 3) A difference value of the RSRP associated with the reference signal relative to a reference power of a different RSRP is smaller than or equal to T-3. In an embodiment, the T-3 is configured by the second communication node, or determined by a variation range of a differential RSRP, or pre-defined in a standard. 4) The RSRP associated with the reference signal is greater than or equal to a threshold T-4. In an embodiment, the T-4 is configured by the second communication node, or determined by a variation range of a differential RSRP, or pre-defined in a standard.

For example, the eNB side configures 8 CSI-RS resources for beam training, and then configures relevant resources for the UE side to feed back the beam reporting, in which 4 beam resources are allowed to be fed back. With channel measurement on 8 CSI resources, the UE side obtains corresponding RSRP results, as shown in Table 1, wherein the CRI is CSI-RS resource indication.

TABLE 1

| | |
|---|---|
| CRI-0 | −79 dBm |
| CRI-1 | −60 dBm |
| CRI-2 | −96 dBm |
| CRI-3 | −74 dBm |
| CRI-4 | −95 dBm |
| CRI-5 | −130 dBm |
| CRI-6 | −110 dBm |
| CRI-7 | −86 dBm |

According to the restriction for feeding back the 4 beam resources, {CRI-0, CRI-1, CRI-3, CRI-7} and corresponding RSRP measurement results may be fed back to the eNB side. For example:

Case 1: in a case where the eNB side configures a minimum feedback threshold, that is, −85 dB, then CRI-7 cannot meet the threshold restriction, and the user side only feeds back the following information: {[CRI-0, −79 dBm], [CRI-1,−60 dBm], [CRI-3, −74 dBm]}.

Case 2: the UE side uses 4-bit for differential reporting, each bit has a step of −1 dB, the maximum RSRP is reported based on an absolute value and others are reported based on a relative value. Specifically, the following differential table is provided, as shown in Table 2.

TABLE 2

| | |
|---|---|
| 4'b0000 | −0 dBm |
| 4'b0001 | −1 dBm |
| 4'b0010 | −2 dBm |
| ... | |
| 4'b1111 | −15 dBm |

When the determination criterion "the difference value of the RSRP associated with the reference signal relative to the maximum RSRP" is executed, and it is determined that the threshold is based on 15 dB of the variation range of the differential table, since the maximum RSRP value is 60 dBm at the UE side, only −75 dBm and above beams are fed back with the report of {[CRI-1, −60 dBm], [CRI-3, −14 dBm (i.e., 4'b1110)]}, and other beams do not meet the criterion.

Case 3: the UE side uses 4-bit for differential reporting, each bit has a step of −1 dB, the maximum RSRP is an absolute value and other reports are differential reporting based on an RSRP that is nearest to the receiving power and may be reported. At the UE side, the maximum RSRP value is −60 dBm, so [CRI-3, −14 dBm (i.e., 4'b1110)] is fed back differentially; then, [CRI-0, −5 dBm (i.e., 4'b0101)] is differentially reported based on −74 dBm; and thereafter, [CRI-7, −7 dBm (i.e., 4'b0111)] is differentially reported based on −79 dBm. In this case, the UE side has the following report information: {{[CRI-1, −60 dBm], [CRI-3, −14 dBm (i.e., 4'b1110], [CRI-0, −5 dBm (i.e., 4'b0101)], [CRI-7, −7 dBm (i.e., 4'b0111)]}.

It is to be noted that in a case where the reference RSRP measured value does not comply with the report values in actual differential reporting, the reference RSRP in the report values should serve as a reference for differential reporting.

In an embodiment, the operation that the first communication node (UE) feeds back the beam reporting is divided into two different parts for feeding back distinctively.

For the beam reporting, different contents are varied in reporting urgency and priority. Therefore, it is recommended that a reporting content is divided into two or more stages, and each stage has corresponding information content and modulation coding mode, thus implementing the requirement on the flexibility of the beam reporting.

The beam reporting content is composed of first information and second information, wherein the first information is composed of at least one or a combination of the following information: the number of the reference signal related indexes; the number of the reference signal groups; a group index of the reference signal group; a maximum RSRP value in the group; a maximum RSRP value; an absolute RSRP in differential reporting; a reference signal related index associated with the absolute RSRP in the differential reporting; a reference signal related index specified by the second communication node; and an RSRP value of a reference signal specified by the second communication node.

Additionally, the second information is composed of the reference signal related index and/or the RSRP. In an embodiment, the reference signal group, which is also referred to as a beam group, has a criterion including at least one or a combination of the followings: in the reference signal group, different reference signals cannot be received simultaneously; in the reference signal group, different reference signals can be received simultaneously; in the reference signal group, W1 different reference signals can be received simultaneously; between the reference signal groups, different reference signals cannot be received simultaneously; between the reference signal groups, different reference signals can be received simultaneously; and between the reference signal groups, W2 different reference signals can be received simultaneously. The W1 and the W2 are a positive integer greater than or equal to 1. In an embodiment, the W1 and the W2 need to be notified to the eNB by the UE, or are determined by the eNB according to a capability of the UE.

In an embodiment, the RSRP is a relative receiving power in the second information; or, the reference signal related index is indicated by using a bitmap in the second information; or, a modulation coding manner of the first information is different from a modulation coding manner of the second information.

In an embodiment, the first information and the second information have one of the following configurations: the first information and the second information are fed back by using the PUCCH resource; the first information and the second information are fed back by using the PUSCH resource; and the first information is fed back by using the PUCCH resource, and the second information is fed back by using the PUSCH resource.

In a case where the first information is fed back by using the PUCCH resource, and the second information is fed back by using the PUSCH resource, the second communication node cannot configure the differential RSRP for feedback; or, the second communication node can configure the differential RSRP for feedback; or, the first communication node does not expect that the second communication node configures the differential RSRP for feedback; or, the first communication node expects that the second communication node configures an absolute RSRP for feedback.

FIG. 12 is a first schematic diagram of a beam reporting feedback method provided by an embodiment of the disclosure. According to the RSRP measurement result of the UE side that is described in Table 1, the UE divides a feedback content into two parts, namely, a first reporting part and a second reporting part, wherein the first reporting part includes first information, and the second reporting part includes second information. The first information bears a reference signal index of a strongest RSRP and an RSRP at this index. The second information bears other reference signal indexes and RSRPs at these indexes. In an embodiment, the second information is reported by using a differential RSRP; and the first information is reported by using an absolute RSRP, with a report result serving as a reference value or one of reference values for the differential RSRP in a second report.

Figure 13:
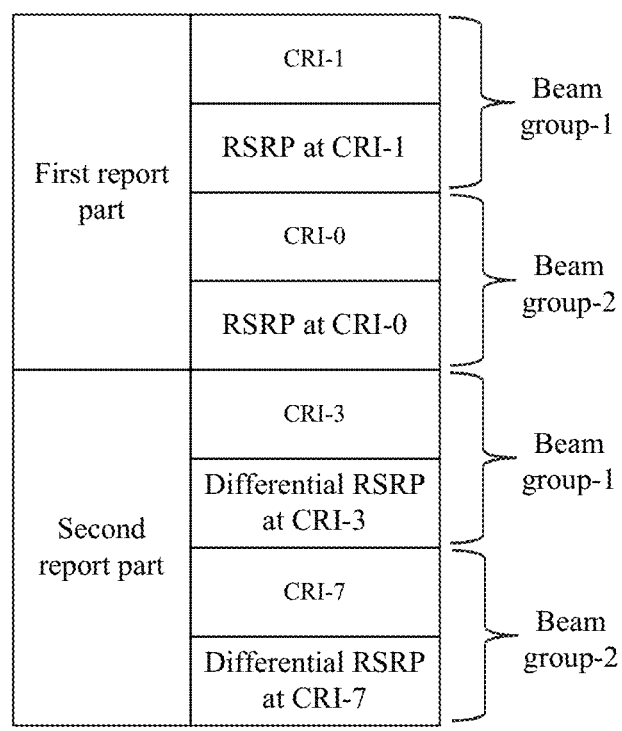
FIG. 13 is a second schematic diagram of a beam reporting feedback method provided by an embodiment of the disclosure.

FIG. 13 is a second schematic diagram of a beam reporting feedback method provided by an embodiment of the disclosure. According to the RSRP measurement result of the UE side that is described in Table 1, and according to the grouping criterion that "in the reference signal group, different reference signals can be received simultaneously; and between the reference signal groups, different reference signals cannot be received simultaneously", specifically, according to the criterion, the UE divides {CRI-1, CRI-3} into a first beam group and {CRI-0, CRI-7} into a second beam group. Different reference signals may be received simultaneously in the group, for example, by means of one air receiving filter or two air receiving filters.

In an embodiment, the UE divides a feedback content into two parts, namely, a first reporting part and a second reporting part. The first reporting part includes first information, and the second reporting part includes second information. The first information bears CRI information of a strongest RSRP and the RSRP thereof in the first beam group (equivalent to the reference signal group) and the second beam group. The second information bears other CRI information in the groups and different RSRP reports that take absolute RSRPs in the groups as references.

In an embodiment, the differential RSRPs in the beam groups are fed back.

In the reference signal group or the beam group, in order to save the feedback overhead, it is necessary to introduce a differential RSRP feedback method. In an embodiment, the method needs to group clearly; and particularly in multiple groups, there is a need for determination of the reference RSRP and a relationship problem between the groups. Specifically, at least one or a combination of the followings is included:

a) In the reference signal group, X reference signals feed back the differential RSRP.
b) Y reference signals are selected from each group in D reference signal groups, and the reference signals feed back the differential RSRP.
c) In each reference signal group and between the reference signal groups, J reference signals feed back the differential RSRP.

The X, the Y the D and the J are positive integers greater than or equal to 1.

a) When X reference signals feed back the differential RSRP in the reference signal group, the reference power of the differential RSRP may be at least one of the followings: an RSRP of a special reference signal in the group; an RSRP of a special reference signal out of the group; a reference value reported by a differential RSRP configured by the eNB; and an RSRP of a special reference signal in the X reference signals.

In an embodiment, the special reference signal is equivalent to the specified reference signal in the above embodiment.

Case b) when Y reference signals are selected from each group in D reference signal groups, and the reference signals feed back the differential RSRP, the reference power of the differential RSRP may be at least one of the followings: an RSRP of a special reference signal in the D reference signal groups; an RSRP of a special reference signal out of the D reference signal groups; a reference value reported by an RSRP configured by the eNB; and an RSRP of a special reference signal in the Y reference signals of the D reference signal groups.

Case c) when J reference signals feed back the differential RSRP in each reference signal group and between the reference signal groups:

The reference power of the differential RSRP may be at least one of the followings: an RSRP of a special reference signal in the J reference signals; a reference value reported by a differential RSRP configured by the eNB; and an RSRP of a special reference signal out of the J reference signals.

For the case a) and the case c), the special reference signal is a reference signal having a maximum or minimum RSRP in internal reference signals of the group; or, the special reference signal is a reference signal having a maximum or minimum RSRP in all reference signals.

Besides, for the feedback of the differential RSRP, the step value of the differential reporting is also very important except for the reference value. The step value of the differential RSRP may be configured via at least one or a combination of the followings: the step value is determined according to a pre-defined step value; the step value is determined according to a reference power of the differential RSRP; and the step value is determined according to the reference power of the differential RSRP and a threshold configured by the second communication node.

A condition for executing the feedback of the differential RSRP includes at least one of the followings: 1) a reference signal type; and 2) the number of reference signals. For example, for the feedback simultaneously supporting the CSI-RS and the SS block, it may be appropriate that only the SS block supports the differential reporting and the SS block does not support the differential reporting, or, the CSI-RS and the SS block may be respectively subjected to the differential reporting, which means that when the CSI-RS and the SS block are subjected to the differential reporting, the reference value of the RSRP may be irrelevant.

For example, the eNB side configures 6 CSI-RS resources for beam training, and then configures relevant resources for the UE side to feed back the beam reporting, in which 2 beam resources are allowed to be fed back provided that the 2 beam resources may be received simultaneously, that is, one beam group is fed back. With channel measurement on 6 CSI resources, the UE side obtains corresponding RSRP results, as shown in Table 3. Meanwhile, CRI-0 and CRI-5 may be received simultaneously, and CRI-1, CRI-2, CRI-3 and
CRI-4 may be received simultaneously.

TABLE 3

| | |
|---|---|
| CRI-0 | −79 dBm |
| CRI-1 | −60 dBm |
| CRI-2 | −66 dBm |
| CRI-3 | −74 dBm |
| CRI-4 | −95 dBm |
| CRI-5 | −100 dBm |

The UE side selects {CRI-1 and CRI-2} for beam grouping and reporting. At this moment, the CRI-1 serves as a reference signal index with a maximum RSRP in the group, and the RSRP value {−60 dBm} uses absolute or non-differential RSRP reporting; and the RSRP value [−66 dBm] of the CRI-2 uses relative RSRP reporting. According to a differential step relationship described in Table 2, a relevant report of the CRI-2 is [CRI-2, −6 dBm (i.e., 4'b0110)]. Therefore, the report has the following content information: {[CRI-1, −60 dBm], [CRI-2, −6 dBm (i.e., 4'b0110)]}.

In a case where the eNB configures that the UE feeds back 4 beam resources and the 4 beam resources meet the assumption that they may be received simultaneously, one beam group is fed back. Meanwhile, the eNB configures that a lower limit for beam selection is −90 dBm. When the differential step is configured as a difference value between the maximum RSRP in the group and the lower limit configured by the eNB, 4-bit may be used in total and a formula for calculating the step value is as follows:

$$\text{Step value} = \{\text{Max of RSRP} - \text{Threshold}\}/(2^n - 1)$$

The Step value denotes the step value, the Max of RSRP denotes the maximum RSRP or the maximum RSRP in the group, or the reference RSRP value, the Threshold denotes the threshold configured by the eNB, and the n denotes the number of bits for the differential reporting. By bringing into the formula, the step value is $(-60-(-90))/15 = 2$ dB. Additionally, considering that the CRI-4 does not meet the threshold requirement, the UE side only reports 3 pieces of beam information (that is, 3 reference beam indexes). The specific reporting information is as follows: {[CRI-1, −60 dBm], [CRI-2, −6 dBm (i.e., 4'b0011)]} {[CRI-3, −14 dBm (i.e., 4'b0111)]}.

In an embodiment, the second communication node (gNB) indicates the beam feedback.

The reference signals configured by the eNB and used for beam training may have different priorities. This is because some reference signals may be used to support the current serving beam or optional beam set, and other reference signals may be merely used for beam training of the general sensor to discover a new potential beam. In this case, the eNB may specify a special beam, and require the UE to report certainly or report preferentially.

For the reference signal sent by the second communication node (that is, the eNB), the second communication node configures a report mode of the reference signal. The report mode includes at least one or a combination of the followings: a first report mode, and a second report mode, wherein the first report mode has a higher priority than the second report mode (or, requires that a beam report must be fed back); or, a threshold of the first report mode is smaller than a threshold of the second report mode. Specifically, the reference signal related index and/or the RSRP of the associated reference signal is reported in the first report mode; and the reference signal related index and/or the RSRP of the associated reference signal may be reported or may not be repeated in the second report mode.

In an embodiment, as the reference signal must be fed back in the first report mode, the UE may not feed back corresponding index information but feeds back a corresponding relationship in an implicit method, for example, the UE indicates the reference signal index via a sequence position of the RSRP.

Concerning how to support differential RSRP reporting, the first report mode and the second report mode are respectively subjected to the differential RSRP feedback; or, the absolute RSRP is used for feedback in the first report mode, and the differential RSRP is used for feedback in the second report mode; or, the absolute RSRP is used for feedback in the second report mode, and the differential RSRP is used for feedback in the first report mode. In an embodiment, the first report mode and the second report mode are respectively subjected to the differential RSRP feedback, or have different step values in differential reporting, or respectively configure the step value.

In an embodiment, a configuration range of the eNB is limited according to a capability of the UE.

According to different capabilities of the UE, a parameter that may be configured by the eNB side is effectively limited, so that the overhead for configuring signaling may be saved, the unnecessary expense for feeding back a resource during channel quality feedback is also saved, and a configuration behavior that cannot be supported by the user side is prevented.

The embodiments of the disclosure provides a method for configuring information, which is applied to a second communication node, and includes at least one of the followings.

The second communication node determines a configuration restriction according to a capability of a first communication node, including at least one or a combination of the followings: a PUCCH, a PRACH, a beam recovery PRACH, a first signaling number-of-times threshold, and a cumulative time threshold.

In an embodiment, the capability of the first communication node involves in at least one or a combination of the followings: a support for beam correspondence; a support for non beam correspondence; a support for partial beam correspondence; and an antenna parameter.

In an embodiment, a PRACH of an associated downlink reference signal that meets a channel pattern assumption is allocated in a same time domain unit, wherein the time domain unit includes a time slot, a subframe, a symbol or a symbol set.

In an embodiment, the antenna parameter includes one or a combination of the followings.

1) the number of antenna ports;
2) a dimensional size of a codebook in a 2-D antenna group and the number of codebooks in the 2-D antenna group;
3) a dimensional size of a 2D beam codebook in an antenna group and the number of 2-D beam codebooks;
4) a dimensional size of a large bandwidth oriented codebook and the number of large bandwidth oriented codebooks;
5) a dimensional size of a small bandwidth oriented codebook and the number of small bandwidth oriented codebooks;
6) a dimensional size of a polarization oriented codebook and the number of polarization oriented codebooks;
7) a size of precision for codebook quantization;
8) whether a downlink receiving codebook is associated with all codebooks or any codebook in 2)-5);
9) the number of antenna panels;
10) the number of rows of the antenna panels;
11) the number of columns of the antenna panels;
12) a topological shape of the antenna panel;

13) the number of rows of antenna elements on the antenna panel;
14) the number of columns of antennas on the antenna panel; and
15) antenna polarization feature.

In conclusion, based on the technical solutions provided by the embodiments of the disclosure, configuration restriction and configuration binding are performed on active beam reporting of a user and beam reporting indicated by an eNB, which specifically includes restriction and binding on PRACH and PUCCH resource configurations; and with time restraint configuration on the active beam reporting of the user, beam feedback indicated by the eNB, and a cooperation method of differential RSRP reporting and absolute RSRP reporting in beam feedback and group feedback indicated by the eNB, the beam reporting efficiency may be effectively improved, and the overhead for configuration and actual implementation may be saved.

Obviously, those skilled in the art should understand that the modules or steps of the disclosure may be implemented by a general-purpose computing device and centralized in a single computing device or distributed over a network consisting of a plurality of computing devices. In an embodiment, they may be implemented by a program code executable by a computing device, so that they may be stored in a storage device and executed by the computing device. Moreover, they may be different from the steps illustrated or described herein in some cases, or implemented by respectively fabricating them into respective integrated circuit modules or by fabricating a plurality of modules or steps of them into a single integrated circuit module. By doing so, the disclosure is not limited to any specific combination of hardware and software.

The above descriptions are only exemplary embodiments of the disclosure and are not intended to limit the disclosure. For the person skilled in the art, the disclosure may have various modifications and changes. Any modification, equivalent replacement, improvement and the like made within a spirit and a principle of the disclosure should be included in a protection scope of the disclosure.

What is claimed is:

1. An information sending method, executed by a first communication node, and comprising:
    receiving a reference signal sent by a second communication node;
    determining information relaxed to the reference signal, wherein the information comprises at least one of the following: information of a reference signal related index, and information of a Reference Signal Received Power (RSRP); and
    feeding the information back to the second communication node;
    wherein in a case where the reference signal is one of X reference signals in a first reference signal group, an RSRP corresponding to one of the X reference signals is fed back in a form of differential RSRP, wherein the X is positive integers greater than or equal to 1, and reference power for calculating the differential RSRP of the X reference signals comprises: an RSRP of a specified reference signal out of the first reference signal group.

2. The method as claimed in claim 1, wherein the reference power for calculating the differential RSRP of the X reference signals further comprises:
    an RSRP of a specified reference signal in a second reference signal group.

3. The method as claimed in claim 2, wherein the specified reference signal is a reference signal having a maximum RSRP in the second reference signal group.

4. The method as claimed in claim 1, wherein a step value of the differential RSRP is determined according to a predefined step value.

5. An information sending method, executed by a second communication node, and comprising:
    sending a reference signal to a first communication node; and
    receiving information fed back by the first communication node and related to the reference signal, wherein the information comprises at least one of the following: information of a reference signal related index, and information of a Reference Signal Received Power (RSRP);
    wherein in a case where the reference signal is one of X reference signals in a first reference signal group, an RSRP corresponding to the X reference signals is received in a form of differential RSRP, the X is positive integers greater than or equal to 1, and reference power for calculating the differential RSRP of the X reference signals comprises: an RSRP of a specified reference signal out of the first reference signal group.

6. The method as claimed in claim 5, wherein the reference power for calculating the differential RSRP of the X reference signals further comprises:
    an RSRP of a specified reference signal in a second reference signal group.

7. The method as claimed in claim 6, wherein the specified reference signal is a reference signal having a maximum RSRP in the second reference signal group.

8. The method as claimed in claim 5, wherein a step value of the differential RSRP is determined according to a predefined step value.

9. An information receiving device, comprising:
    a memory, configured to store a program
    a processor, configured to run the program to perform the steps of the information receiving method as claimed in claim 1.

10. An information sending device comprising:
    a memory, configured to store a program; and
    a processor, configured to run the program to perform steps of the information sending method as claimed in claim 5.

* * * * *